United States Patent [19]
Kiriishi et al.

[11] Patent Number: 5,406,045
[45] Date of Patent: Apr. 11, 1995

[54] METHOD OF CONTROLLING WELDING CURRENT IN DIRECT-CURRENT RESISTANCE WELDING MACHINE

[75] Inventors: Daisuke Kiriishi; Hisaya Watanabe; Kensaku Kaneyasu; Tomohiko Ito; Yukihiro Yaguchi, all of Sayama, Japan

[73] Assignee: Honda Giken Kogyo Kabushiki Kaisha, Tokyo, Japan

[21] Appl. No.: 171,673

[22] Filed: Dec. 22, 1993

[30] Foreign Application Priority Data

Dec. 24, 1992 [JP] Japan .................................. 4-344727

[51] Int. Cl.⁶ ............................................. B23K 11/24
[52] U.S. Cl. .................................... 219/110; 219/117.1
[58] Field of Search ............. 219/108, 109, 110, 117.1

[56] References Cited

U.S. PATENT DOCUMENTS

| | | |
|---|---|---|
| 4,694,135 | 9/1987 | Nagel et al. |
| 4,973,814 | 11/1990 | Kojima et al. ........................ 219/110 |
| 5,083,003 | 1/1992 | Clark, Jr. et al. .................... 219/110 |
| 5,276,308 | 1/1994 | Hasegawa ............................ 219/110 |

FOREIGN PATENT DOCUMENTS

| | | |
|---|---|---|
| 502478 | 9/1992 | European Pat. Off. . |
| 56-009080 | 1/1981 | Japan . |
| 58-43192 | 9/1983 | Japan . |
| 2273675 | 6/1994 | United Kingdom . |
| 91-19588 | 12/1991 | WIPO . |

Primary Examiner—Clifford C. Shaw

[57] ABSTRACT

A workpiece is welded successively at a plurality of welding points by a direct-current resistance welding machine with a constant current in a welding current supply period at each of the welding points, and the constant current is varied depending on whether expulsions are produced on the workpiece when it is welded, to determine an expulsion-producing limit current value as a maximum current beyond which expulsions will be produced. The workpiece is welded with a first stepped welding current having a first current value that is smaller than the expulsion-producing limit current value by a predetermined value and a second current value that is greater than the expulsion-producing limit current value, and an average current value higher than the expulsion-producing limit current value, and also with a second stepped welding current having a variation of the second current value based on whether expulsions are produced or not on the workpiece when it is welded with the first stepped welding current.

12 Claims, 29 Drawing Sheets

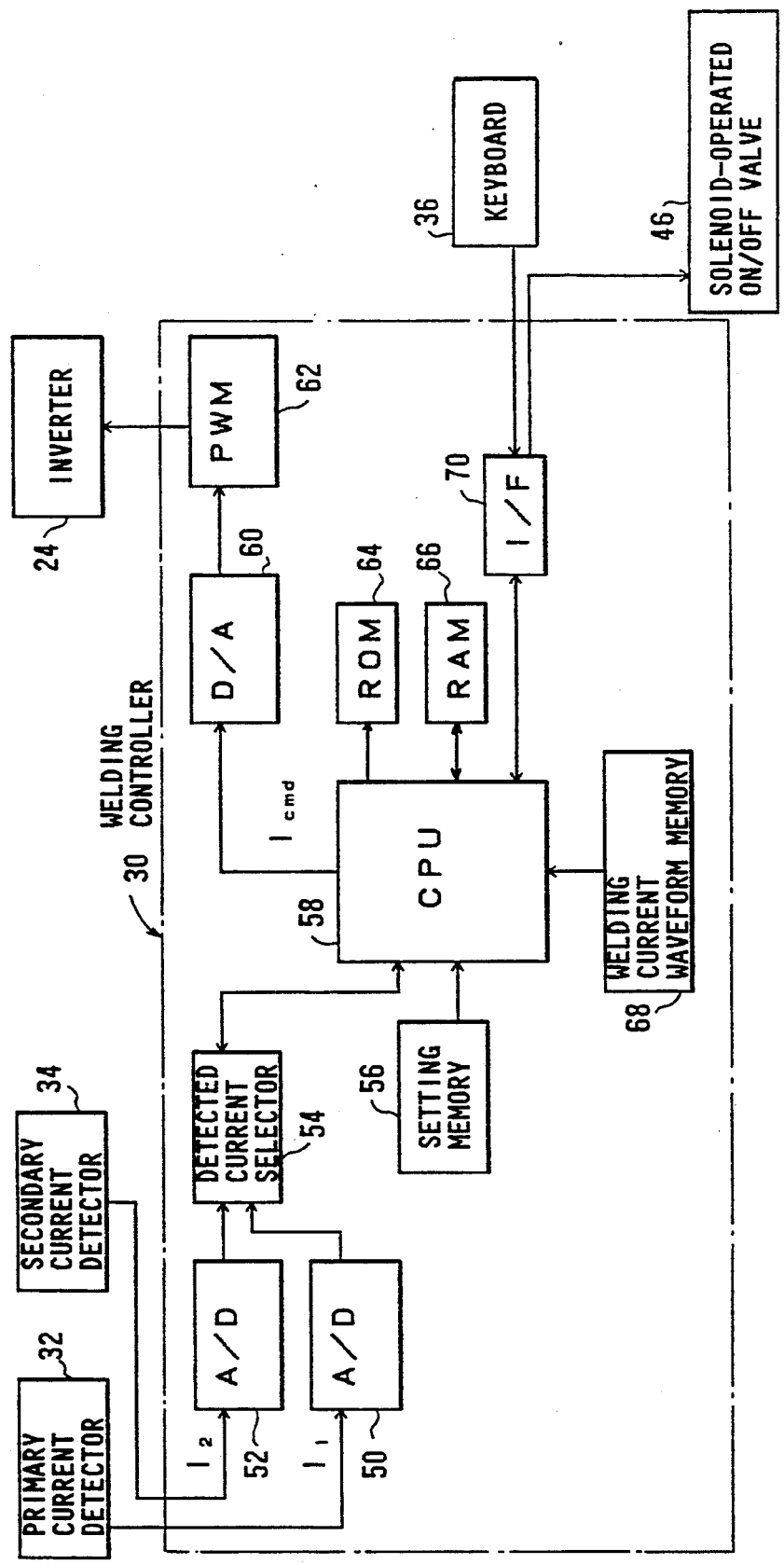

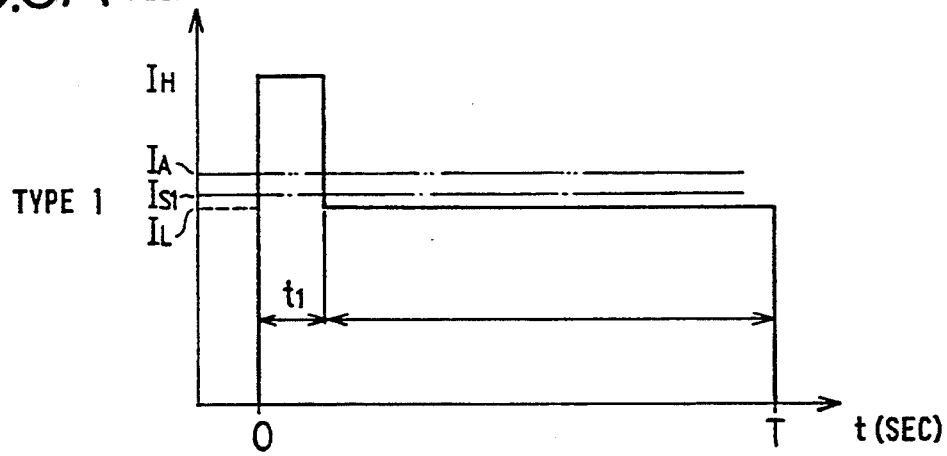
FIG.3A  WELDING CURRENT I (A) — TYPE 1
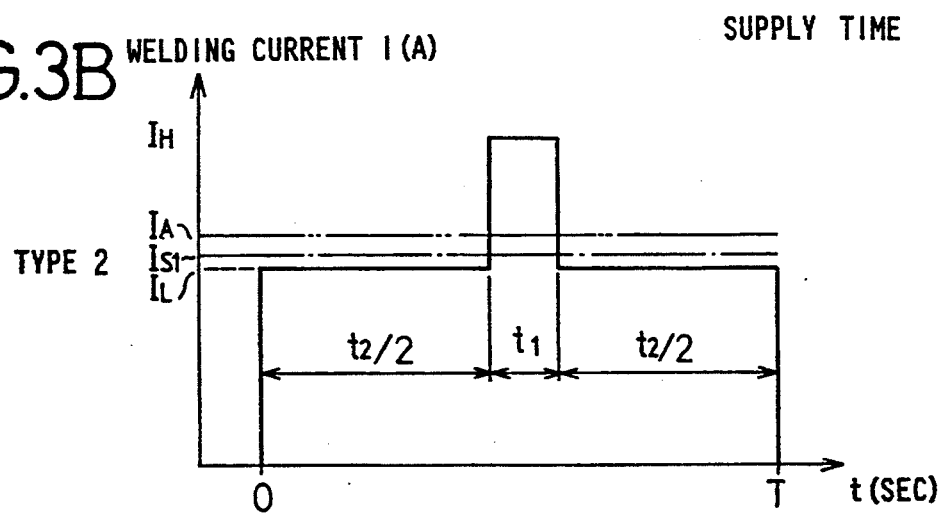
FIG.3B  WELDING CURRENT I (A) — TYPE 2
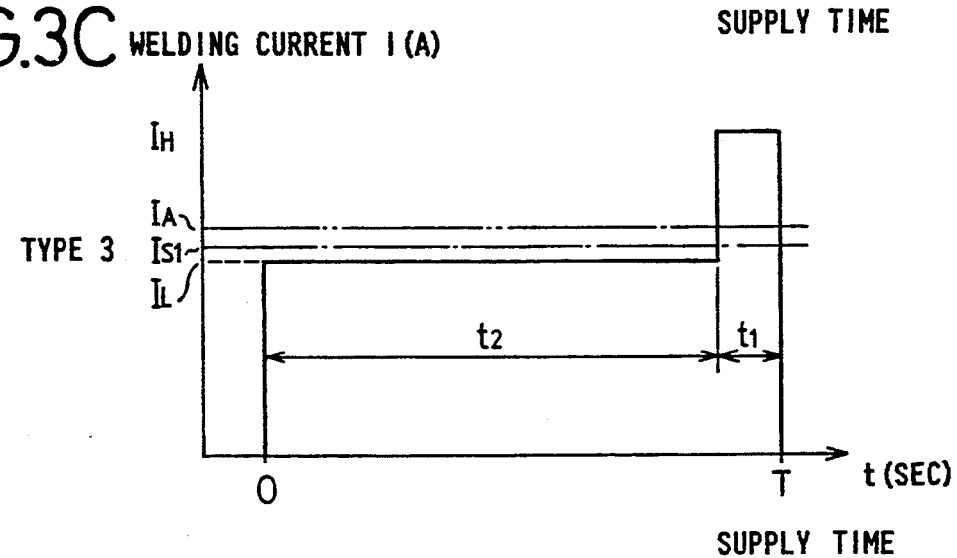
FIG.3C  WELDING CURRENT I (A) — TYPE 3

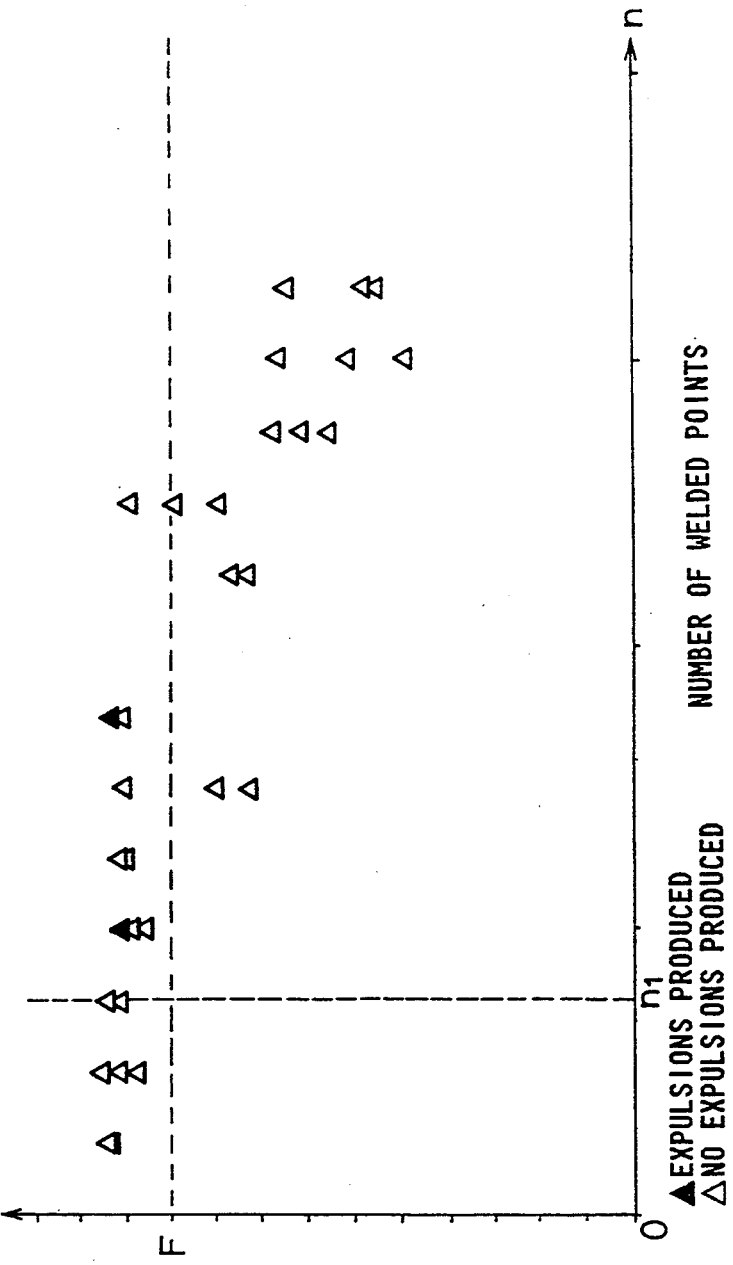

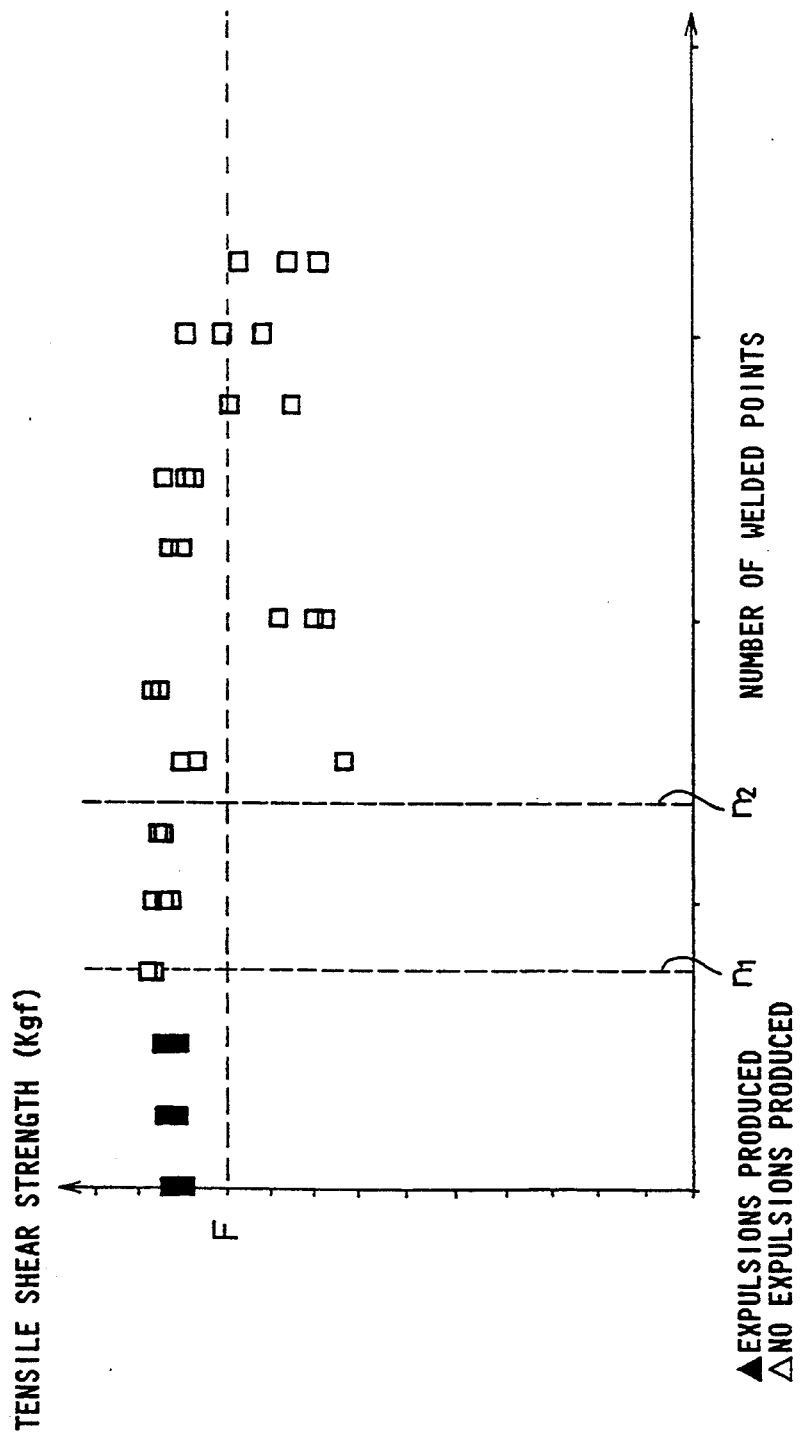

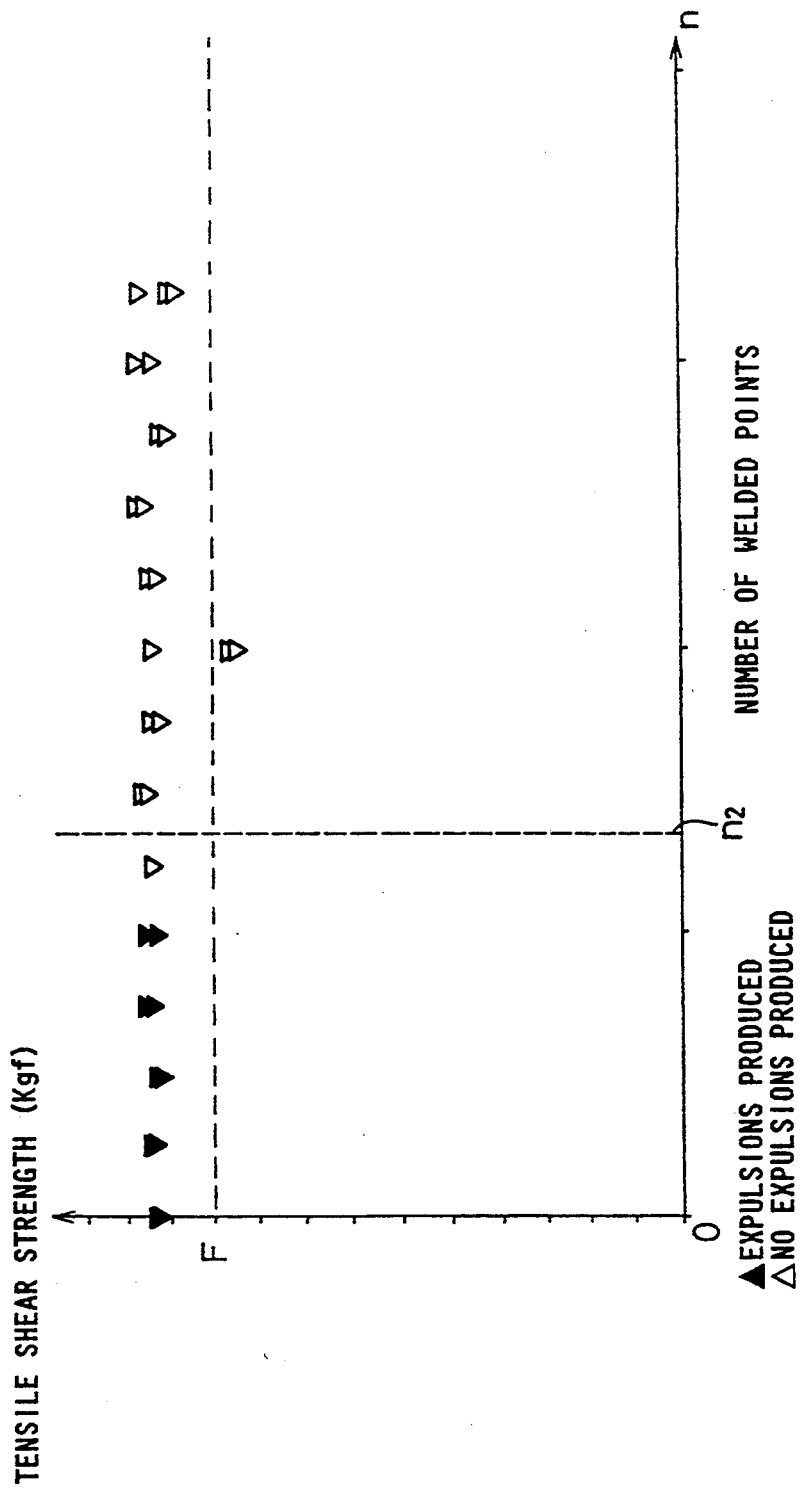

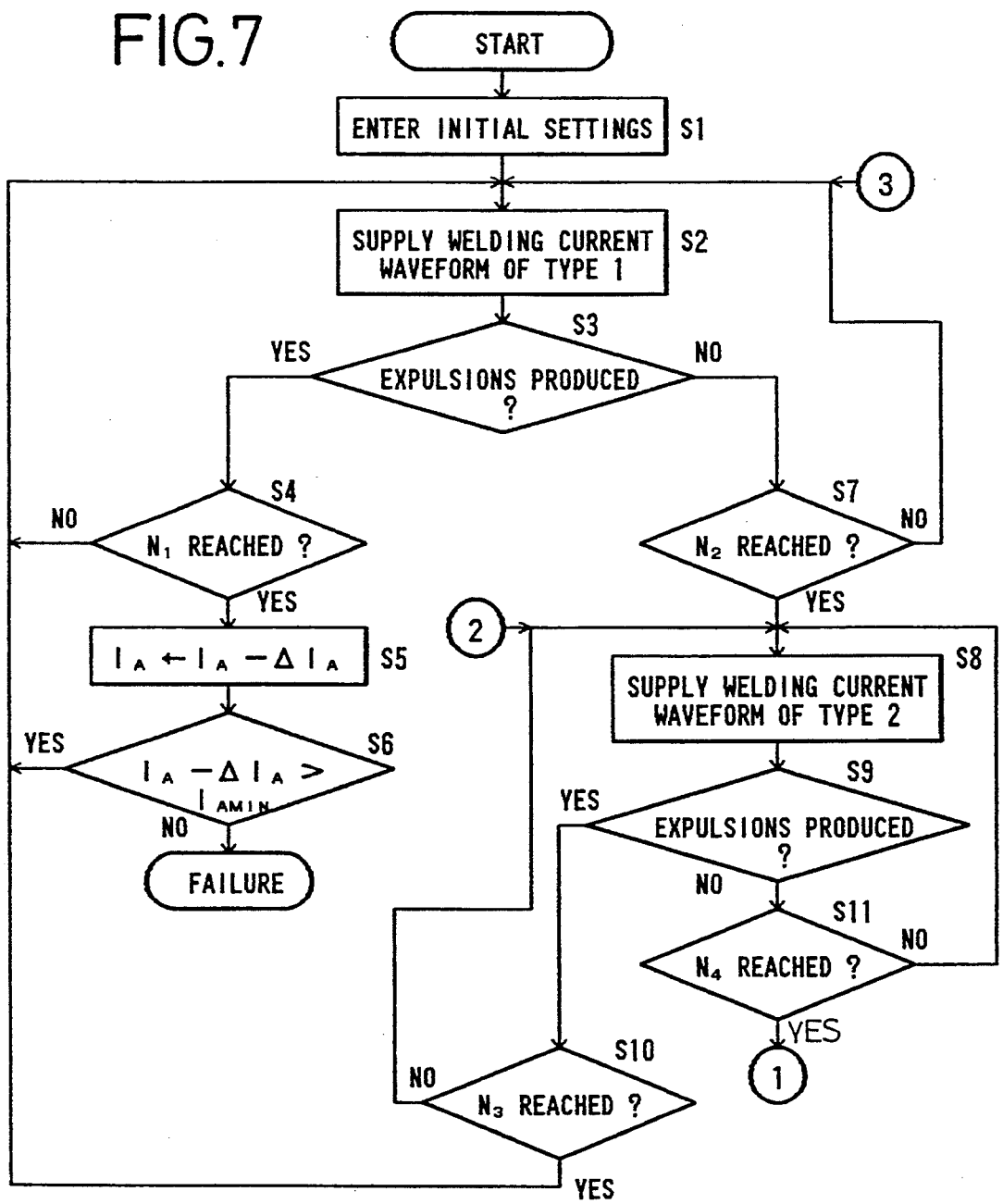

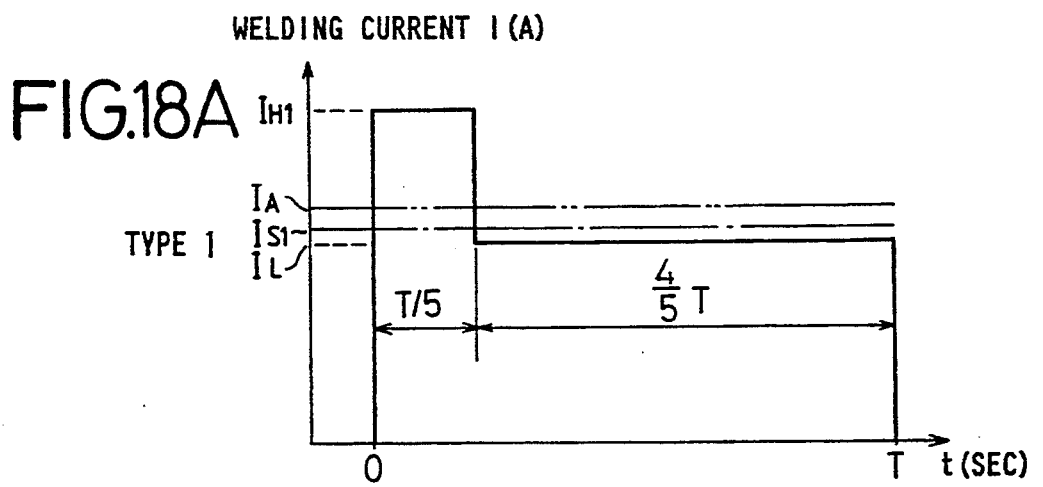
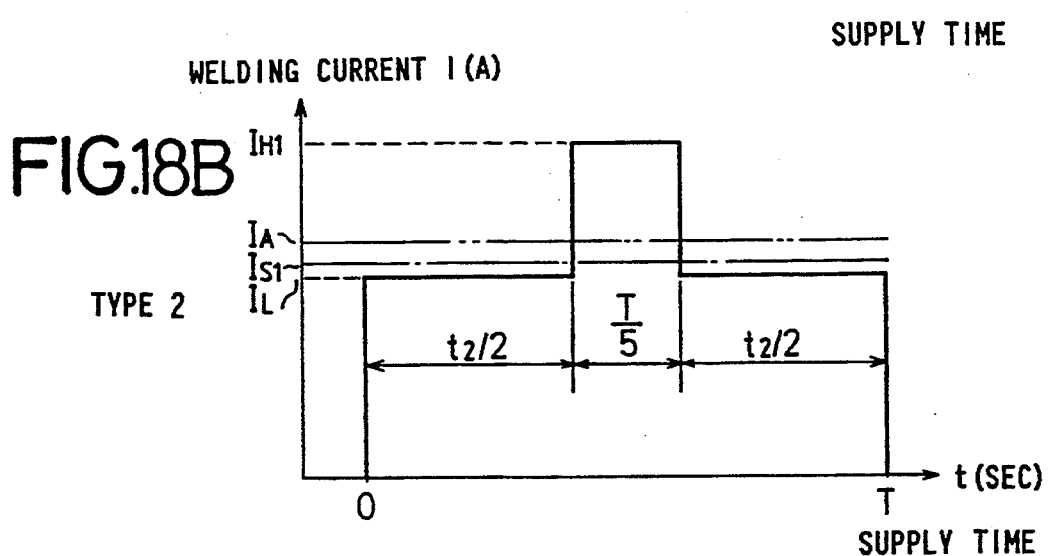
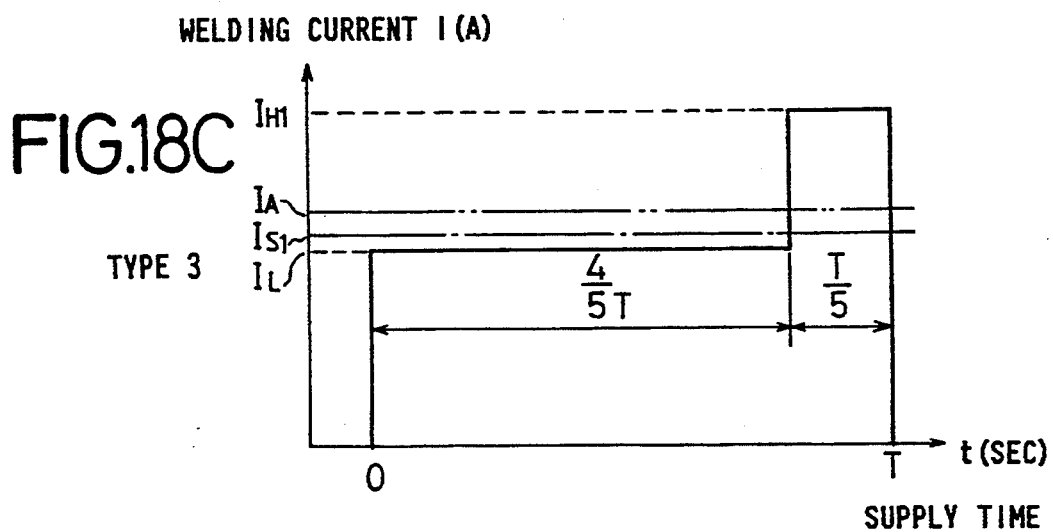

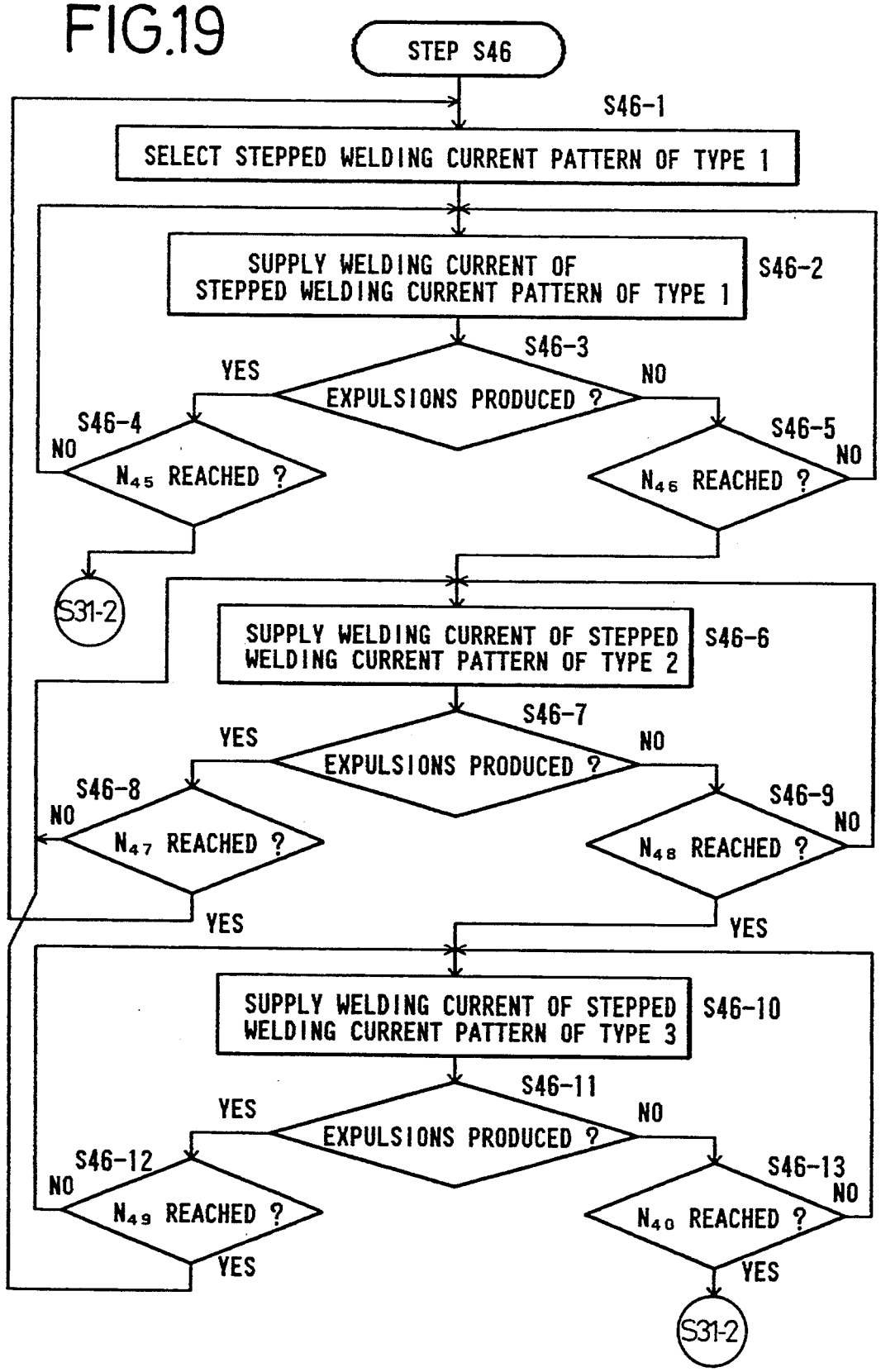

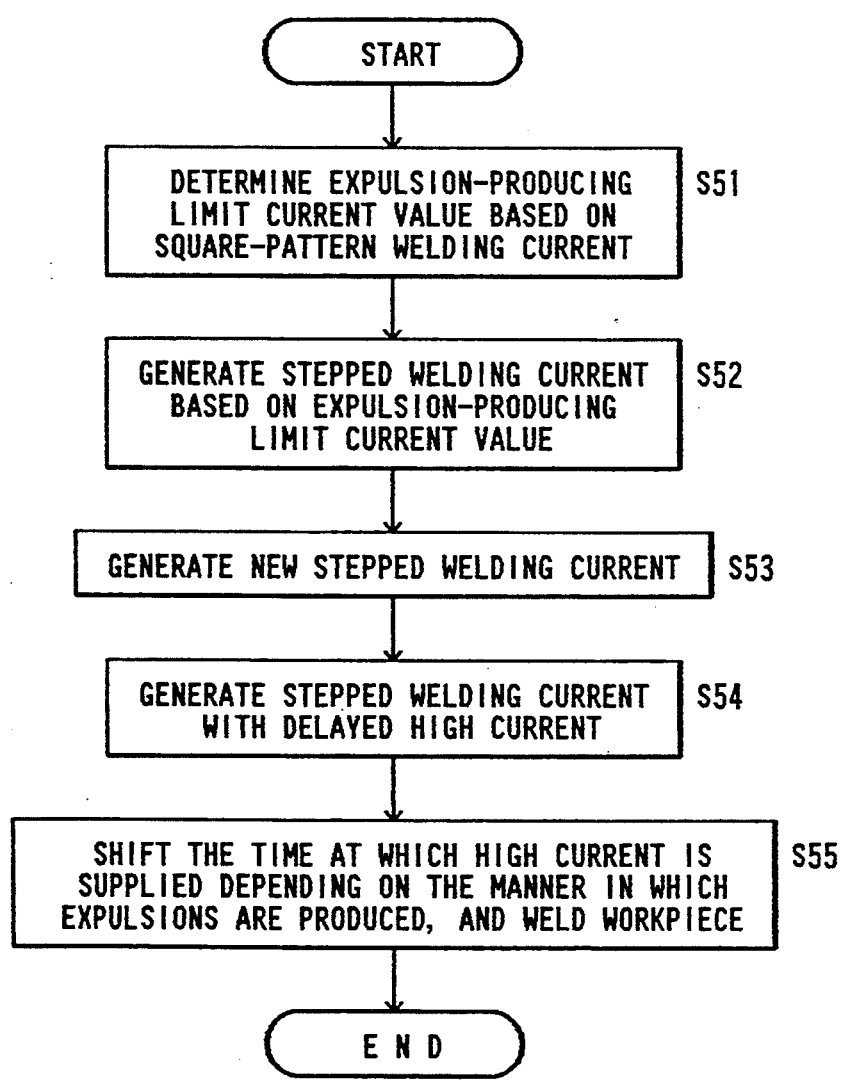

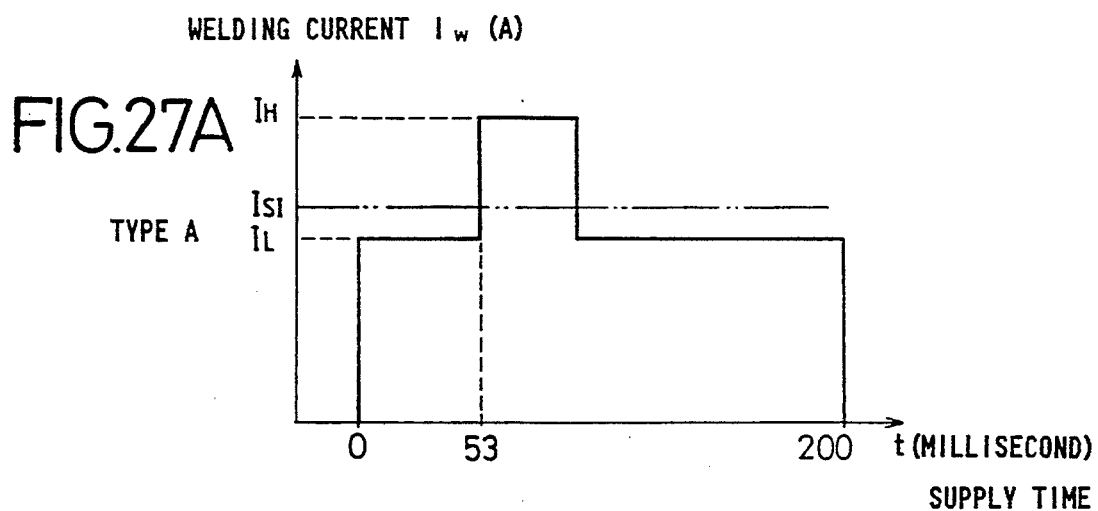
FIG.27A TYPE A
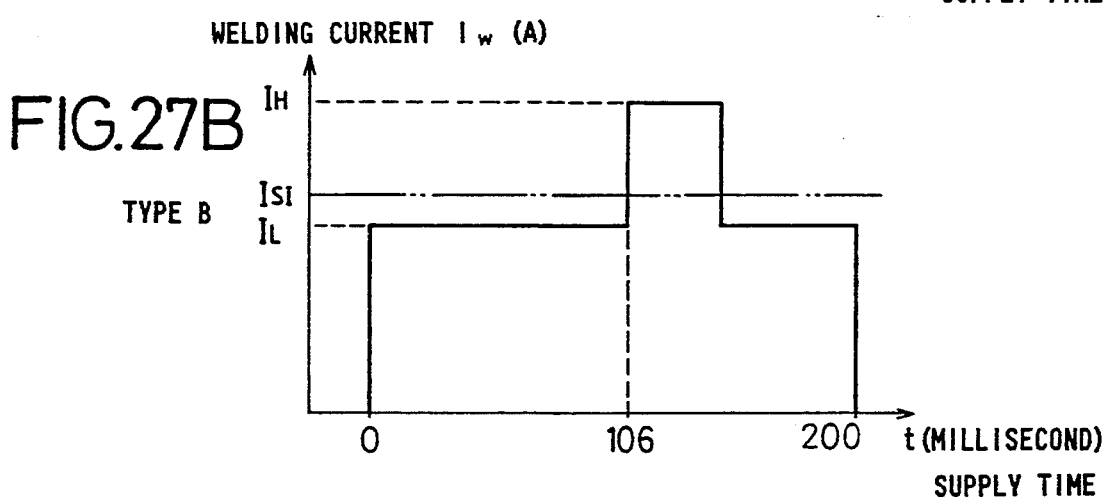
FIG.27B TYPE B
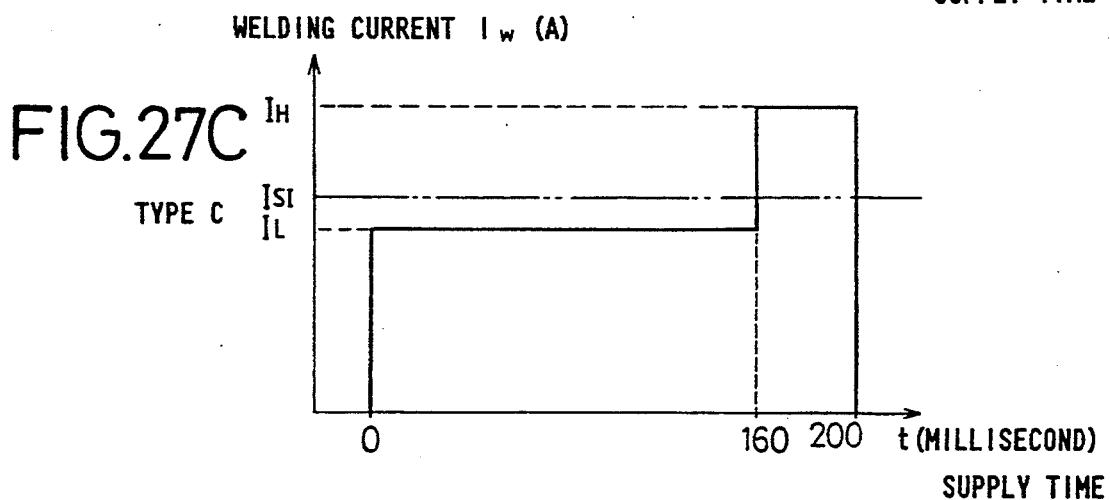
FIG.27C TYPE C

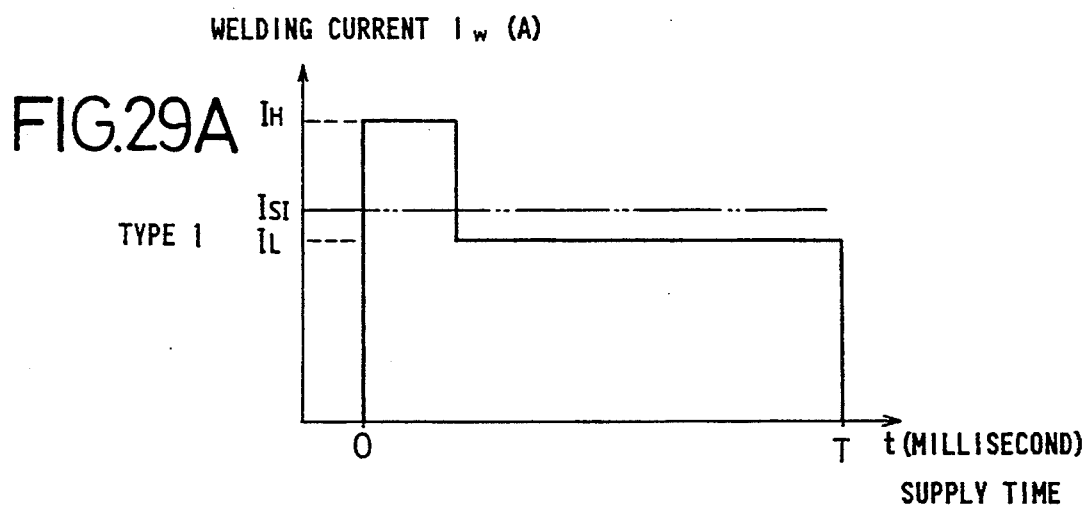

METHOD OF CONTROLLING WELDING CURRENT IN DIRECT-CURRENT RESISTANCE WELDING MACHINE

BACKGROUND OF THE INVENTION

1. Field of the Invention

The present invention relates to a method of controlling a welding current in a direct-current resistance welding machine, and more particularly to a method of controlling the waveform of a welding current depending on the manner in which expulsions are produced or the number of successive welding cycles when a plurality of welding points are successively welded with a welding current having a staircase waveform.

2. Description of the Related Art:

Direct-current resistance welding machines are widely used in the welding industry. According to the welding process using direct-current resistance welding machines, it is customary to control the welding quality by controlling the pressure under which a workpiece is gripped by a gun arm, the time during which a welding current is supplied to the workpiece, and the waveform of the welding current. It is known that the welding current which is controlled has an optimum value lower than and as close to a limit current value (hereinafter referred to as an "expulsion-producing limit current value") beyond which expulsions would be produced as possible, and when a workpiece is welded with such an optimum welding current, no expulsions are generated and a sufficient welding strength, i.e., a tensile shear strength, is achieved.

To weld a workpiece according to such a practice, the operator of a direct-current resistance welding machine detects an expulsion-producing limit current value by gradually increasing or reducing the welding current, determines an optimum welding current value based on the detected expulsion-producing limit current value, and welds the workpiece with the determined optimum welding current value.

A technical concept for controlling the waveform of a welding current is disclosed in Japanese patent publication No. 58-43192 entitled "spot-welding process". According to the disclosed spot-welding process, a workpiece is welded for stable welding strength with a staircase welding current whose value is initially higher than an expulsion-producing limit current value and then lower than the expulsion-producing limit current value after a nugget is formed and the voltage applied between electrodes becomes lower than its peak value.

When a plurality of welding points on the workpiece are successively welded with such an optimum welding current value that is determined according to the disclosed spot- welding process, however, since the expulsion-producing limit current value is gradually increased as the tip ends of the electrodes that grip the workpiece are worn, the welding current will become insufficient and no sufficient welding strength will be achieved if the initially established optimum welding current is maintained throughout the welding operation. Consequently, the disclosed spot-welding process is not effective in successively spot-welding the workpiece.

SUMMARY OF THE INVENTION

It is therefore an object of the present invention to provide a method of controlling a welding current in a direct-current resistance welding machine to achieve a high welding strength stably when a workpiece is welded successively at a plurality of welding points or spots thereon.

To achieve the above object, there is provided in accordance with a first aspect of the present invention a method of controlling a welding current in welding a workpiece successively at a plurality of welding points with a direct-current resistance welding machine, comprising the steps of welding the workpiece with a stepped welding current having at least a first current value and a second current value greater than the first current value, if expulsions are produced on the workpiece while it is welded, advancing the time when the second current value is attained in a welding current supply period with respect to each of the welding points, and if no expulsions are produced on the workpiece while it is welded, delaying the time when the second current value is attained in the welding current supply period.

In the first aspect of the present invention, the method may further comprise the step of delaying the time when the second current value is attained in the welding current supply periods successively whenever a given number of welding points have been welded.

When the workpiece is welded successively at the welding points, the average current is not varied, but the time at which the second current value starts being supplied is varied for thereby supplying an optimum welding current to form good nuggets.

To achieve the above object, there is provided in accordance with a second aspect of the present invention a method of controlling a welding current in welding a workpiece successively at a plurality of welding points with a direct-current resistance welding machine, comprising the steps of welding the workpiece with a constant current in a welding current supply period, varying the constant current depending on whether expulsions are produced on the workpiece when it is welded, to determine an expulsion-producing limit current value as a maximum current beyond which expulsions will be produced, welding the workpiece with a first stepped welding current having a first current value that is smaller than the expulsion-producing limit current value by a predetermined value and a second current value that is greater than the expulsion-producing limit current value, and an average current value higher than the expulsion-producing limit current value, and welding the workpiece with a second stepped welding current having a variation of the second current value based on whether expulsions are produced or not on the workpiece while it is welded with the first stepped welding current.

In the above-stated method, the step of welding the workpiece with a second stepped welding current having a variation of the second current value may be substituted by the step of shifting the time when the second current value is attained within the period in which the second stepped welding current is supplied to each of the welding points, based on whether expulsions are produced or not on the workpiece while it is welded with the second stepped welding current.

In the second aspect of the present invention, the method may further comprise the steps of increasing the constant current if expulsions are not produced successively a first number of times while the workpiece is being welded with the constant current, and reducing the constant current if expulsions are produced successively a second number of times while the workpiece is being welded with the constant current, or the steps of increasing the second current value if expulsions are not produced successively a third number of times while the workpiece is being welded with the second stepped welding current, and reducing the second current value if expulsions are produced successively a fourth number of times while the workpiece is being welded with the second stepped welding current.

The method may also comprise the steps of delaying the time when the second current value is supplied within the welding current supply period if expulsions are not produced successively a fifth number of times while the workpiece is being welded with the second stepped welding current, and advancing the time when the second current value is supplied within the welding current supply period if expulsions are produced successively a sixth number of times while the workpiece is being welded with the second stepped welding current.

According to the second aspect of the present invention, the expulsion-producing limit current value is determined, the stepped welding currents are generated based on the expulsion-producing limit current value, and the optimum time at which the second current value is attained is determined from the standpoint of the production of expulsions.

To achieve the above object, there is provided in accordance with a third aspect of the present invention a method of controlling a welding current in welding a workpiece successively at a plurality of welding points with a direct-current resistance welding machine, comprising the steps of welding the workpiece with a constant current for a welding current supply period, varying the constant current depending on whether expulsions are produced on the workpiece while it is welded, to determine an expulsion-producing limit current value as a maximum current beyond which expulsions will be produced, welding the workpiece successively for a given number of welding points with a welding current having the expulsion-producing limit current value, after the workpiece has been welded at the given number of welding points, welding the workpiece with a stepped welding current having a first current value that is smaller than the expulsion-producing limit current value by a predetermined value and a second current value that is greater than the expulsion-producing limit current value, and an average current value higher than the expulsion-producing limit current value, delaying the time when the second current value is attained by a predetermined time from the start time of supplying the stepped welding current, and shifting the time when the second current value is attained within the period in which the stepped welding current is supplied to each of the welding points, based on whether expulsions are produced or not on the workpiece while it is welded with the stepped welding current.

In the third aspect of the present invention, the method may further comprise the steps of increasing the constant current if expulsions are not produced successively a seventh number of times while the workpiece is being welded with the constant welding current, and reducing the constant current if expulsions are produced successively an eighth number of times while the workpiece is being welded with the constant welding current, the steps of increasing the second current value if expulsions are not produced successively a ninth number of times while the workpiece is being welded with the first stepped welding current, and reducing the second current value if expulsions are produced successively a tenth number of times while the workpiece is being welded with the first stepped welding current, or the steps of delaying the time when the second current value is attained within the welding current supply period if expulsions are not produced successively an eleventh number of times while the workpiece is being welded with the second stepped welding current, and advancing the time when the second current value is attained within the welding current supply period if expulsions are produced successively a twelfth number of times while the workpiece is being welded with the second stepped welding current.

According to the third aspect of the present invention, the workpiece can be welded with a constant current and an optimum stepped welding current in which both the value and the attaining time of the second current value are adjusted with respect to the expulsions.

To achieve the above object, there is further provided in accordance with a fourth aspect of the present invention a method of controlling a welding current in welding a workpiece successively at a plurality of welding points with a direct-current resistance welding machine, comprising the steps of welding the workpiece at each of the welding points with a constant current for a welding current supply period, varying the constant current depending on whether expulsions are produced on the workpiece while it is welded, to determine an expulsion-producing limit current value as a maximum current beyond which expulsions will be produced, welding the workpiece at each of the welding points successively for a given number of welding points with a welding current having the expulsion-producing limit current value, after the workpiece has been welded at the given number of welding points, welding the workpiece with a stepped welding current having a first current value that is smaller than the expulsion-producing limit current value by a predetermined value and a second current value that is greater than the expulsion-producing limit current value, and an average current value higher than the expulsion-producing limit current value, delaying the time when the second current value is attained within the welding current supply period if expulsions are not produced successively a thirteenth number of times while the workpiece is being welded with the stepped welding current, and advancing the time when said second current value is attained within the welding current supply period if expulsions are produced successively a fourteenth number of times while the workpiece is being welded with the stepped welding current.

According to the fourth aspect of the present invention, the workpiece can be welded with a constant current and an optimum stepped welding current in which both the value and the attaining time of the second current value are adjusted with respect to the expulsions. Since the constant current is not corrected after it is set, the welding machine and the operation thereof are simplified.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a block diagram of a welding controller in the direct-current resistance welding machine shown in FIG. 1;

FIGS. 3A, 3B, and 3C are diagrams showing welding current waveforms of types 1, 2, 3, respectively;

FIGS. 4, 5, and 6 are diagrams showing welding strength transitions at the time a plurality of welding points are welded with the welding current waveforms of types 1, 2, 3, respectively;

FIGS. 7 and 8 are a flowchart of a method of controlling a welding current according to a first embodiment of the present invention;

FIG. 18A, 18B and 18C are diagrams showing welding current waveforms of types 1, 2, 3, respectively;

FIG. 19 is a flowchart of a detailed sequence of a step S46 in the main flowchart shown in FIG. 16;

FIG. 20 is a main flowchart of a method of controlling a welding current according to a fifth embodiment of the present invention;

FIGS. 27A, 27B, and 27C are diagrams showing stepped current patterns of types A, B, C, respectively, generated in a step S63 in the main flowchart shown in FIG. 24;

FIG. 29A, 29B and 29C are diagrams showing welding current waveforms of types 1, 2, 3, respectively.

DETAILED DESCRIPTION OF THE PREFERRED EMBODIMENTS

Figure 1:
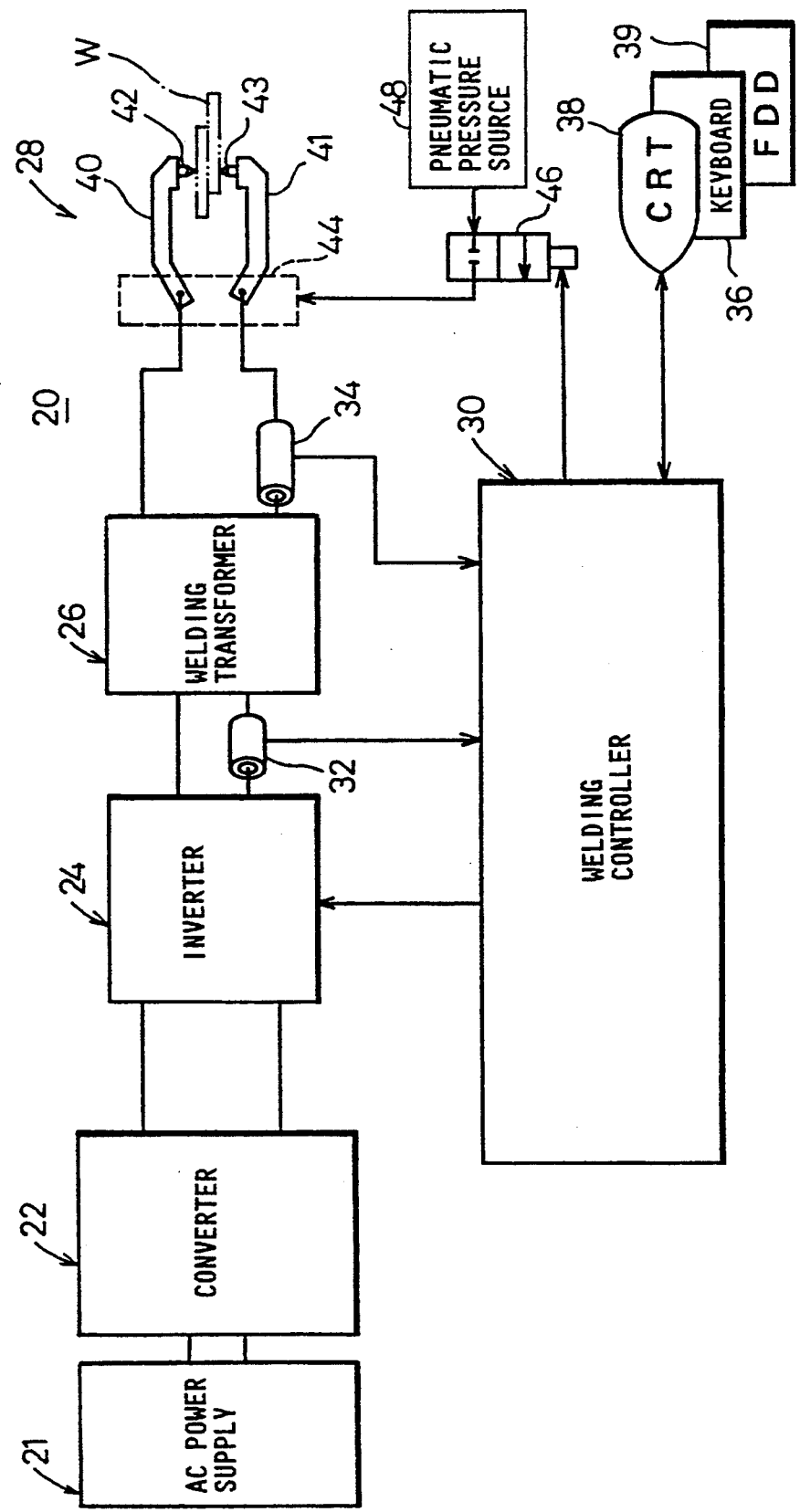
FIG. 1 is a block diagram of an inverter-type direct-current resistance welding machine which carries out a method of controlling a welding current according to the present invention.

Methods of controlling a welding current according to various preferred embodiments of the present invention are carried out by an inverter-type direct-current resistance welding machine 20 shown in FIG. 1.

As shown in FIG. 1, the inverter-type direct-current resistance welding machine 20 comprises a converter 22 for converting an alternating current supplied from an AC power supply 21 into a direct current by way of full-wave rectification, an inverter 24 for converting the direct current from the converter 22 into a high-frequency alternating current, a welding transformer 26 for transforming and rectifying the high-frequency alternating current from the inverter 24, a welding gun 28 for gripping a workpiece W, and a welding controller 30 for controlling a welding current supplied to the workpiece W.

The inverter-type direct-current resistance welding machine 20 also has a primary current detector 32 comprising a toroidal coil for detecting a welding current (hereinafter referred to as a "primary current") $I_1$ flowing through the primary coil of the welding transformer 26, a secondary current detector 34 comprising a toroidal coil for detecting a welding current (hereinafter referred to as a "secondary current") $I_2$ flowing through the secondary coil of the welding transformer 26, a key board 36 for entering welding conditions, etc. into the welding controller 30, a CRT 38 as a display unit for displaying various information, and a floppy disk driver (FDD) 39 for writing data on and reading data from a floppy disk as an external memory medium.

The welding gun 28 comprises a pair of movable gun arms 40, 41 for gripping the workpiece W therebetween, a pair of electrode tips 42, 43 fixed respectively to confronting end surfaces of the movable gun arms 40, 41, and a pneumatic cylinder 44 for closing and opening the movable gun arms 40, 41 to grip and release the workpiece W. A pneumatic pressure source 48 is connected through a solenoid-operated on/off valve 46 to the pneumatic cylinder 44. The solenoid-operated on/off valve 46 is controlled by the welding controller 30 such that when the workpiece W is to be welded, the welding controller 30 controls the solenoid-operated on/off valve 46 to supply a pneumatic pressure from the pneumatic pressure source 48 to the pneumatic cylinder 44 for thereby closing the movable gun arms 40, 41 to cause the electrode tips 42, 43 to grip the workpiece W. The workpiece W is welded with a welding current flowing therethrough while it is being thus gripped between the movable gun arms 40, 41.

The welding controller 30 is shown in detailed block form in FIG. 2. As shown in FIG. 2, the welding controller 30 comprises an analog-to-digital (A/D) converter 50 for converting the primary current $I_1$ supplied from the primary current detector 32 into a corresponding digital value, an A/D converter 52 for converting the secondary current $I_2$ supplied from the secondary current detector 34 into a corresponding digital value, a detected current selector 54 for selecting the digital primary current $I_1$ outputted by the A/D converter 50 or the digital secondary current $I_2$ outputted by the A/D converter 52, and a setting memory 56 for storing initial settings with respect to welding operation.

The welding controller 30 also comprises a central processing unit (CPU) 58 for controlling an interface (I/F) 70 and other circuits and reading the initial settings from the setting memory 56, a digital-to-analog (D/A) converter 60 for converting a command value $I_{cmd}$ for a welding current from the CPU 58 into a corresponding analog value, and a pulse width modulator (PWM) 62 for generating pulses having a duty cycle based on the analog signal outputted by the D/A converter 60. The PWM 62 supplies generated pulses to the inverter 24 to energize same.

The welding controller 30 also includes a read-only memory (ROM) 64 for storing a control program to be executed by the CPU 58 to control the various circuits in the welding controller 30, a random-access memory (RAM) 66 for temporarily storing processed data while the CPU 58 is controlling the various circuits in the welding controller 30, a welding current waveform memory 68 for storing a plurality of welding current waveforms, and an I/F 70 for connecting the keyboard 36, the CRT 38, the FDD 39, and the solenoid-operated on/off valve 46 to the CPU 58.

The inventor has found out that when the workpiece W is welded with a two-step welding current composed of a high current $I_H$ and a low current In (see FIGS. 3A through 3C), expulsions can be prevented from being produced and a good nugget can be formed depending on the time when the high current $I_H$ starts being supplied within a welding current supply period T (a period of time during which the welding current is supplied to the workpiece W) even if a high current supply period $t_1$ (a period of time during which the high current $I_H$ is supplied to the workpiece W) remains the same.

The inventor has confirmed in an experiment that during an initial period of a process of welding the workpiece W successively at a plurality of welding points, a stable welding strength can be achieved by supplying the high current $I_H$ initially in the welding current supply period T and then shifting the time when the high current $I_H$ starts being supplied as the number N of welding cycles increases.

FIGS. 3A through 3C show welding current waveforms of types 1, 2, 3, respectively, employed in the experiment, and FIGS. 4 through 6 illustrate data of tensile shear strength produced with the welding current waveforms of types 1, 2, 3.

Specifically, FIG. 4 shows a welding strength transition at the time the workpiece W is welded with the welding current waveform of type 1 shown in FIG. 3A. FIG. 5 shows a welding strength transition at the time the workpiece W is welded with the welding current waveform of type 2 shown in FIG. 3B. FIG. 6 shows a welding strength transition at the time the workpiece W is welded with the welding current waveform of type 3 shown in FIG. 3C.

As shown in FIG. 4, when the workpiece W is welded successively at a plurality of welding points with the welding current waveform of type 1, no expulsions are produced and a sufficient welding strength is achieved up to a number $n_1$ of welding cycles or spots, e.g., 800 welding spots. However, when the number of welding cycles or spots exceeds 800, the welding strength becomes unstable. The welding strength is greatly lowered with a much greater number of welding cycles or spots.

As shown in FIG. 5, when the workpiece W is welded successively at a plurality of welding points with the welding current waveform of type 2, a stable and sufficient welding strength is achieved when the number of welding cycles or spots ranges from 801 to $n_2$, e.g., 1200. Many expulsions are produced when the number of successive welding cycles ranges from 1 to 800. The welding strength becomes unstable when the number of welding cycles or spots exceeds 1200.

As shown in FIG. 6, when the workpiece W is welded successively at a plurality of welding points with the welding current waveform of type 3, expulsions are produced in most cases when the number of successive welding cycles ranges from 1 to 1200. A stable and sufficient welding strength is accomplished when the number of welding cycles or spots exceeds 1200.

1st Embodiment

Figure 8:
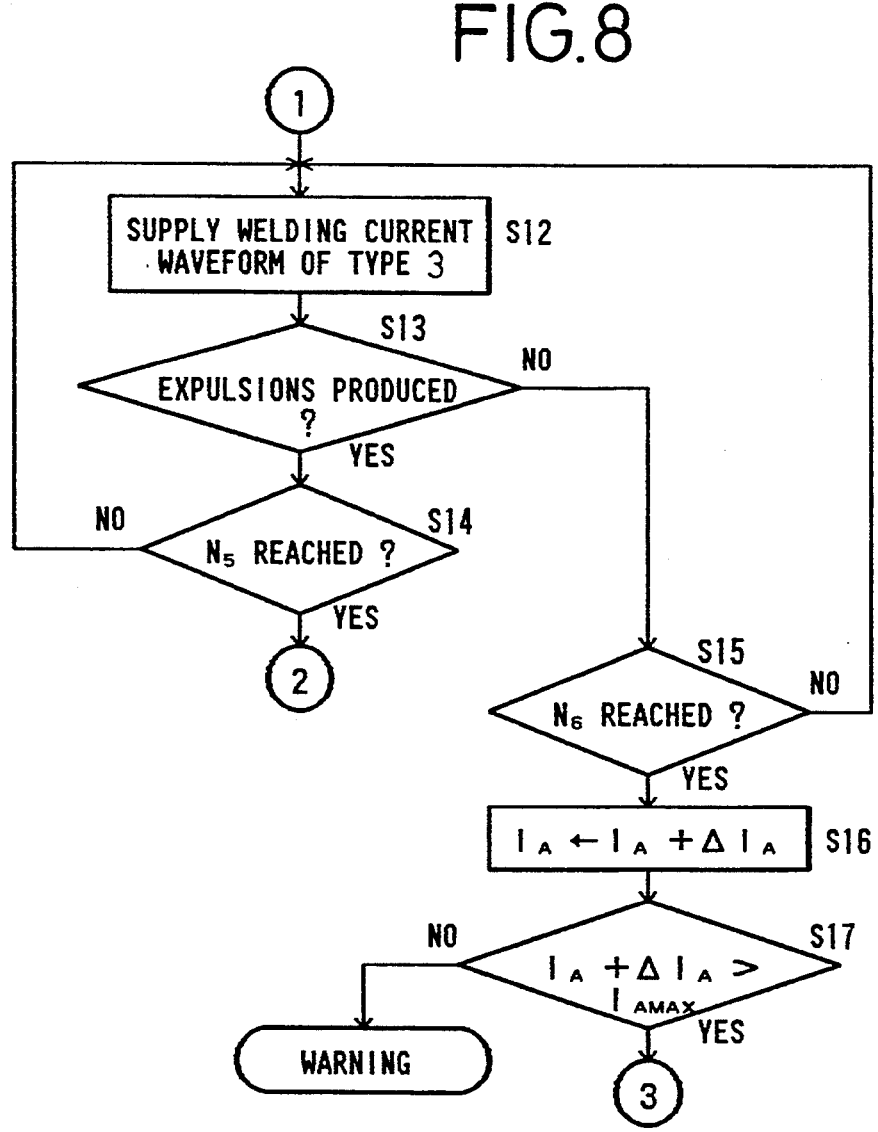

A method of controlling the time when the high current $I_H$ starts being supplied to the workpiece W according to a first embodiment of the present invention will be described below with reference to FIGS. 7 and 8.

First, various initial settings for welding operation are established by the operator in a step S1.

Specifically, when data indicative of detection of expulsions on the workpiece W with the secondary current $I_2$, for example, are entered through the keyboard 36, the CPU 58 reads the data through the I/F 70, and outputs a selection signal to select the secondary current $I_2$ to the detected current selector 54.

When settings $N_1$, $N_3$, $N_5$ for determining the number N of successive welding cycles in which expulsions are successively produced at the time a plurality of welding points are successively welded, and settings $N_2$, $N_4$, $N_6$ for determining the number of times that expulsions are not successively produced at the time a plurality of welding points are successively welded are entered, these settings are stored in the setting memory 56.

When a welding current supply period T, an average current $I_A$ of a two-step welding current waveform, a high current supply time $t_1$, and a low current $I_L$ are established, the CPU 58 determines a high current $I_H$ according to equations given below, and generates a two-step welding current waveform.

The average current $I_A$ is the sum of an expulsion-producing limit current value $I_{S1}$ that has been determined by supplying the workpiece W with a square welding current waveform and a predetermined value $Id_1$, e.g., 500~1000 A. The high current supply time $t_1$ is 1/5, for example, of the welding current supply period T. The low current $I_L$ is the difference between the expulsion-producing limit current value $I_{S1}$ and a predetermined value $I_{d2}$, e.g., 200 A. Based on these values, the high current $I_H$ of the two-step welding current waveform is determined as follows:

$$I_A = I_{S1} + I_{d1} \quad (1).$$

$$I_A \times T = I_H \times (1/5)T + (I_{S1} - 200) \times (4/5)T \quad (2).$$

When the equation (1) is substituted in the equation (2), $$(I_{S1} + I_{d1})T = I_H \times (1/5)T + (I_{S1} - 200) \times (4/5)T.$$

$$I_{S1}+I_{d1}=(1/5)\times I_H+(4/5)\times I_{S1}-160,$$

$$I_H=I_{S1}+5I_{d1}+800.$$

Figure 9:
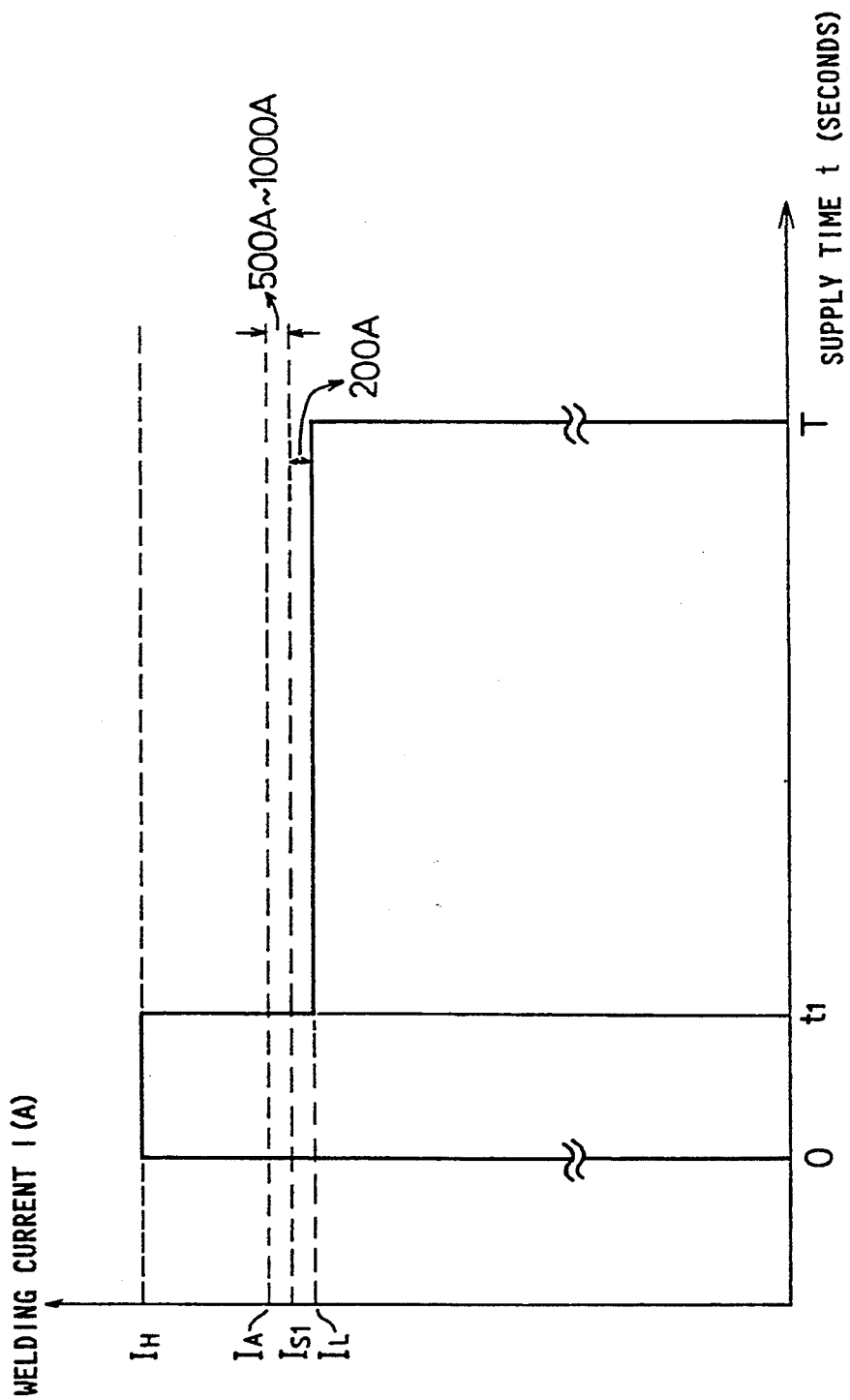
FIG. 9 is a diagram showing the waveform of a two-step welding current that is generated in the method of controlling a welding current according to the first embodiment.

The two-step welding current waveform thus generated is shown in FIG. 9.

Based on the two-step welding current waveform, the CPU 58 generates the welding current waveforms of types 1, 2, 3 (see FIGS. 3A through 3C) by shifting the time at which the high current $I_H$ starts being supplied successively from the time at which the welding current starts being supplied, and stores the generated welding current waveforms in the welding current waveform memory 68.

When a welding process is started, the CPU 58 supplies a welding current to the workpiece W based on the welding current waveform of type 1 (see FIG. 3A) read from the welding current waveform memory 68 in a step S2.

The welding current waveform of type 1 is such that the high current $I_H$ higher than the expulsion-producing limit current value $I_{S1}$ is supplied from the start of the welding process for a period $t_1$, and then the low current $I_L$ lower than the expulsion-producing limit current value $I_{S1}$ is supplied from the end of the period $t_1$ for a period $t_2$ till the end of the welding process.

The CPU 58 then determines whether expulsions are produced or not from the secondary current $I_2$ detected by the secondary current detector 34 in a step S3. If expulsions are produced, then the CPU 58 determines whether the number N of successive welding cycles has reached a preset value $N_1$ or not in a step S4. If the number N of successive welding cycles has not reached the preset value $N_1$, then the CPU 58 judges the expulsions as being produced by dust or the like that has entered between the electrode tips 42, 43 and the workpiece W, and welds the workpiece W with the welding current waveform of type 1 again in the step S2.

If the number N of successive welding cycles has reached the preset value $N_1$, then the CPU 58 judges the average current $I_A$ as being too high, and reduces the average current $I_A$ by a value $\Delta I_A$ stored in the setting memory 56 according to the following equation (3) in a step S5. Thereafter, the CPU 58 determines the reduced average current $I_A$ is greater than a predetermined minimum average current $I_{AMIN}$ stored in the setting memory 56 in a step S6.

$$I_A \leftarrow I_A - \Delta I_A \quad (3).$$

If $I_A - \Delta I_A > I_{AMIN}$, then the CPU 58 generates a two-step welding current waveform composed of a new high current $I_{H1}$ and low current $I_{L1}$ based on the average current $I_A - \Delta I_A$, and welds the workpiece W with the welding current waveform of type 1 having the average current $I_A - \Delta I_A$ in the step S2. If $I_A - \Delta I_A$ is not greater than $I_{AMIN}$, then the CPU 58 judges the condition as a failure, and displays the failure on the CRT 38.

If no expulsions are produced in the step S3, then the CPU 58 determines whether the number N of successive welding cycles in which no expulsions are produced has reached a preset value $N_2$ or not in a step S7. If the number N of successive welding cycles has not reached the preset value $N_2$, then the CPU 58 judges the expulsions as being produced occasionally, i.e., judges the workpiece W as being welded with the average current $I_A$ that can achieve a sufficient welding strength, and welds the workpiece W with the welding current waveform of type 1 again in the step S2.

If the number N of successive welding cycles in which no expulsions are produced has reached the preset value $N_2$ in the step S7, then the CPU 58 reads the welding current waveform of type 2 from the welding current waveform memory 68, and supplies a welding current of the read welding current waveform to the workpiece W in a step S8.

The welding current waveform of type 2 is such that the low current $I_L$ lower than the expulsion-producing limit current value $I_{S1}$ is supplied from the start of the welding process for ½ of the period $t_2$, i.e., for a period of $t_2/2$ seconds, then the high current $I_H$ higher than the expulsion-producing limit current value $I_{S1}$ is supplied from the end of the period of $t_2/2$ seconds for the period $t_1$, and finally the low current $I_L$ is supplied for the period of $t_2/2$ seconds till the end of the welding process (see FIG. 3B).

The CPU 58 then determines whether expulsions are produced or not with the welding current waveform of type 2 in a step S9. If expulsions are produced, then the CPU 58 determines whether the number N of successive welding cycles in which expulsions are produced has reached a preset value $N_3$ or not in a step S10. If the number N of successive welding cycles has not reached the preset value $N_3$, then the CPU 58 judges the workpiece W as being welded with the average current $I_A$ that can achieve a sufficient welding strength, and welds the workpiece W with the welding current waveform of type 2 again in the step S8.

If the number N of successive welding cycles has reached the preset value $N_3$, then the CPU 58 judges the time at which the high current $I_H$ starts being supplied as being late, and control goes back to the step S2 in which the CPU 58 supplies a welding current of the welding current waveform of type 1 to the workpiece W.

If no expulsions are produced in the step S9, then the CPU 58 determines whether the number N of successive welding cycles in which no expulsions are produced has reached a preset value $N_4$ or not in a step S11. The CPU 58 continues to weld the workpiece W with the welding current waveform of type 2 until the preset value $N_4$ is reached. When the preset value $N_4$ is reached in the step S11, the CPU 58 reads the welding current waveform of type 3 from the welding current waveform memory 68, and supplies a welding current of the read welding current waveform to the workpiece W in a step S12.

The welding current waveform of type 3 is such that the low current $I_n$ lower than the expulsion-producing limit current $I_{S1}$ is supplied from the start of the welding process for the period $t_2$, and then the high current $I_H$ higher than the expulsion-producing limit current $I_{S1}$ is supplied from the end of the period $t_2$ for the period $t_1$ till the end of the welding process (see FIG. 3C).

The CPU 58 determines whether expulsions are produced or not with the welding current waveform of type 3 in a step S13. If expulsions are produced, then the CPU 58 determines whether the number N of successive welding cycles in which expulsions are produced has reached a preset value $N_5$ or not in a step S14. If the number N of successive welding cycles has not reached the preset value $N_5$, then the CPU 58 judges the expulsions as being produced occasionally, i.e., judges the workpiece W as being welded with the average current $I_A$ that can achieve a sufficient welding strength, and keeps welding the workpiece W with the welding current waveform of type 3 again in the step S12.

If the number N of successive welding cycles has reached the preset value $N_5$, then the CPU 58 judges the time at which the high current $I_H$ starts being supplied as being late, and control goes back to the step S8 in which the CPU 58 supplies a welding current of the welding current waveform of type 2 to the workpiece W.

If no expulsions are produced in the step S13, then the CPU 58 determines whether the number N of successive welding cycles in which no expulsions are produced has reached a preset value $N_6$ or not in a step S15. If the number N of successive welding cycles has not reached the preset value $N_6$, then the CPU 58 judges the workpiece W as being welded with an optimum welding current which produces occasional expulsions, and keeps welding the workpiece W with the welding current waveform of type 3 in the step S12.

If the number N of successive welding cycles has reached the preset value $N_6$, then the CPU 58 judges the average current $I_A$ as being too low because the expulsion-producing limit current value $I_{S1}$ increases, and increases the average current $I_A$ by a value $\Delta I_A$ stored in the setting memory 56 according to the following equation (4) in a step S16.

$$I_A \leftarrow I_A + \Delta I_A \qquad (4).$$

Thereafter, the CPU 58 determines the increased average current $I_A$ is greater than a predetermined maximum average current $I_{AMIX}$ stored in the setting memory 56 in a step S17. If $I_A + \Delta I_A < I_{AMIN}$, then the CPU 58 generates a two-step welding current waveform composed of a new high current $I_{H2}$ and low current $I_{L2}$ based on the average current $I_A + \Delta I_A$, and welds the workpiece W with the welding current waveform of type 1 having the average current $I_A + \Delta I_A$ in the step S2. If $I_A + \Delta I_A$ is greater than $I_{AMAX}$, then the CPU 58 judges the average current $I_A + \Delta I_A$ as being higher than the maximum average current $I_{AMAX}$ that can be supplied by the welding transformer 26, and displays a failure on the CRT 38.

A subroutine may be executed in which if the number N of successive welding cycles has reached the preset value $N_6$, then the CPU 58 does not carry out the steps S16, S17, but displays a prompt to grind or dress the electrode tips 42, 43 on the CRT 38, followed by control returning to the step S2.

When control goes from the step S7 to the step S8, from the step S11 to the step S12, and from the step S15 to the step S16, the steps S8, S12, S16 may be carried out after the workpiece W is welded in a predetermined number of welding cycles with the welding current waveforms in the steps S7, S11, S15, respectively.

In the first embodiment, when the workpiece W is welded successively in a plurality of welding cycles, one of the welding current waveforms of types 1, 2, 3 stored in the welding current waveform memory 68 is selected, at a time, depending on the manner in which expulsions are produced, and the workpiece W is supplied with a welding current of the selected welding current waveform. Therefore, the workpiece W can be welded for a sufficient welding strength while being prevented from producing expulsions.

While in the first embodiment one of the welding current waveforms of types 1, 2, 3 stored in the welding current waveform memory 68 is selected, at a time, depending on the manner in which expulsions are produced, the CPU 58 may output a command relative to the time at which the high current $I_H$ starts being supplied to continuously control such time for more accurately controlling the welding current.

In the first embodiment, expulsions are detected based on the secondary current $I_2$. However, expulsions may be detected based on the primary current $I_1$, the voltage between the electrode tips 42, 43, the displacement of the electrode tips 42, 43, the acceleration of displacement of the electrode tips 42, 43, acoustic emission, or the like.

2nd Embodiment

Figure 10:
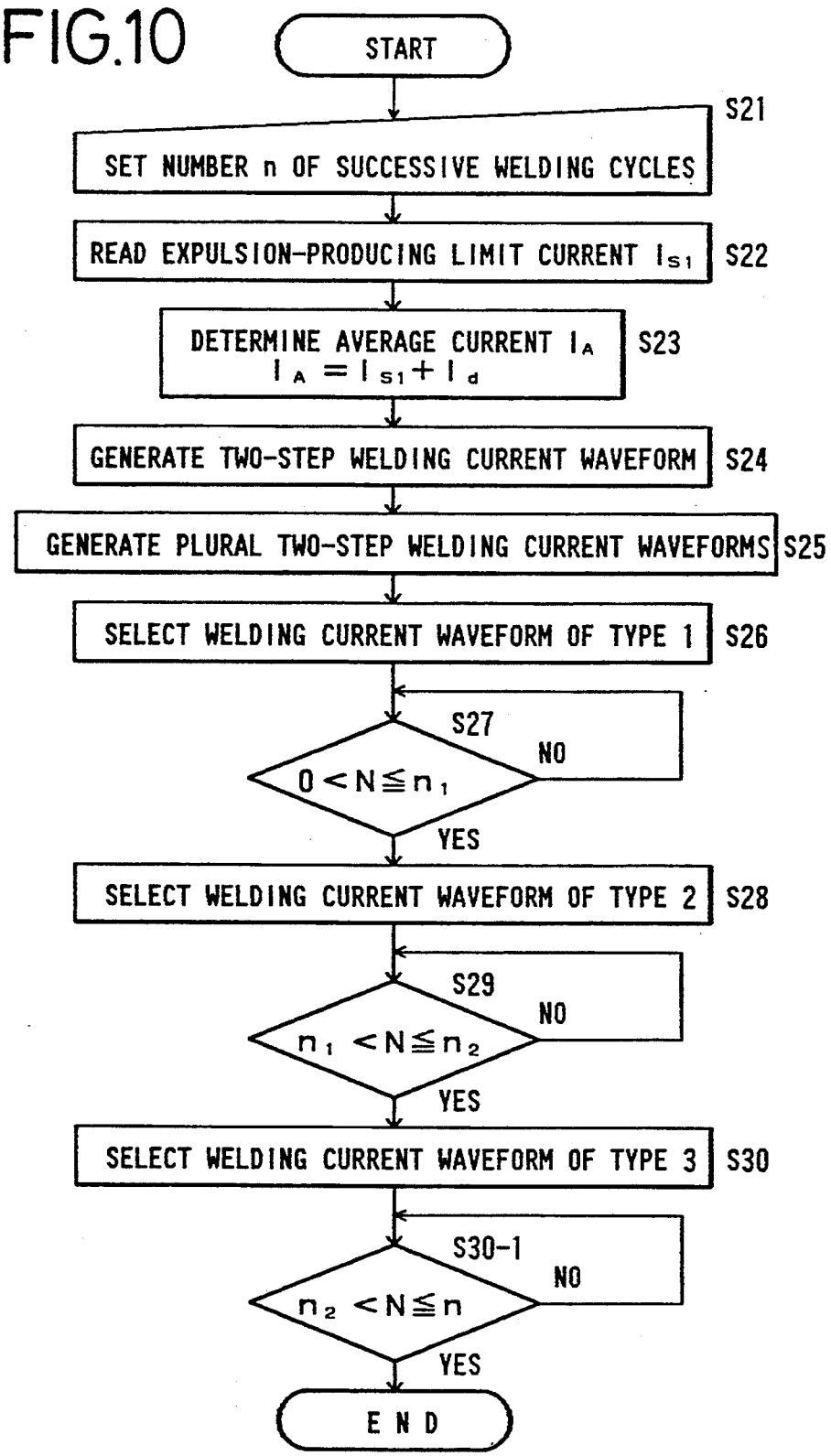
FIG. 10 is a flowchart of a process of selecting a welding current waveform with a preset number of successive welding cycles in a method of controlling a welding current according to a second embodiment of the present invention.
Figure 11:
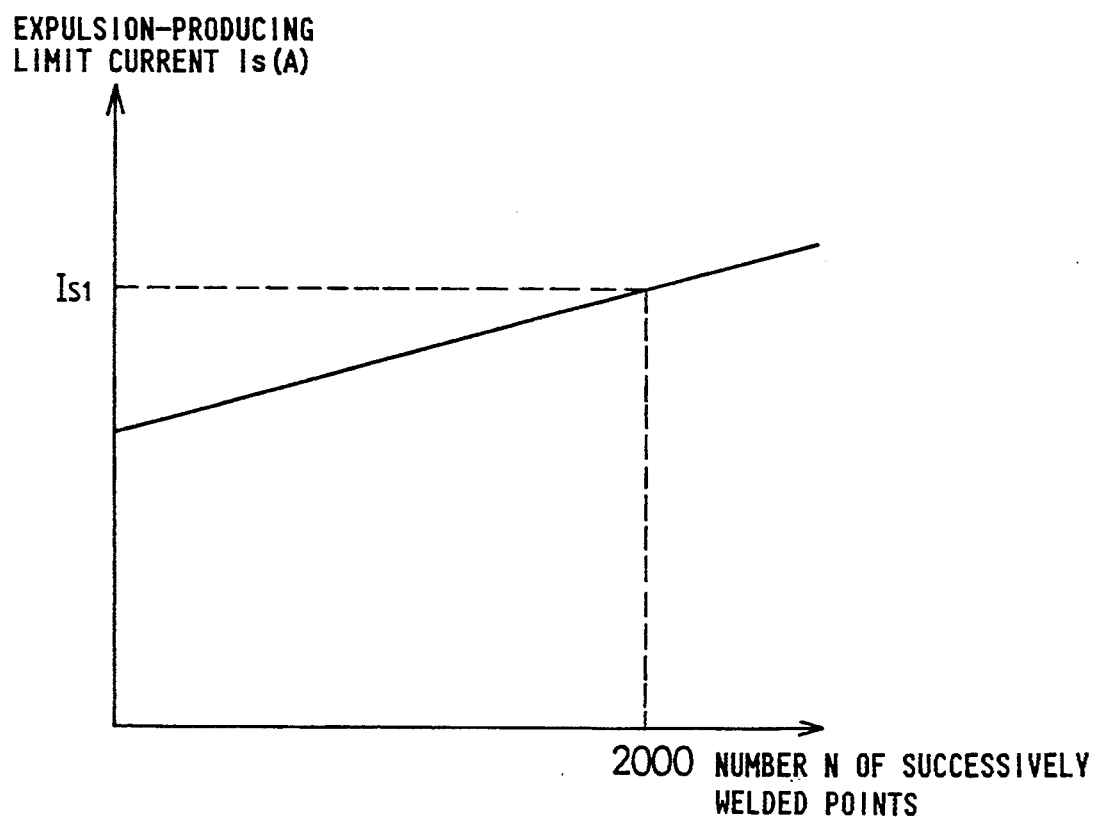
FIG. 11 is a diagram illustrative of a process of determining an expulsion-producing limit current from the preset number of successive welding cycles.
Figure 12:
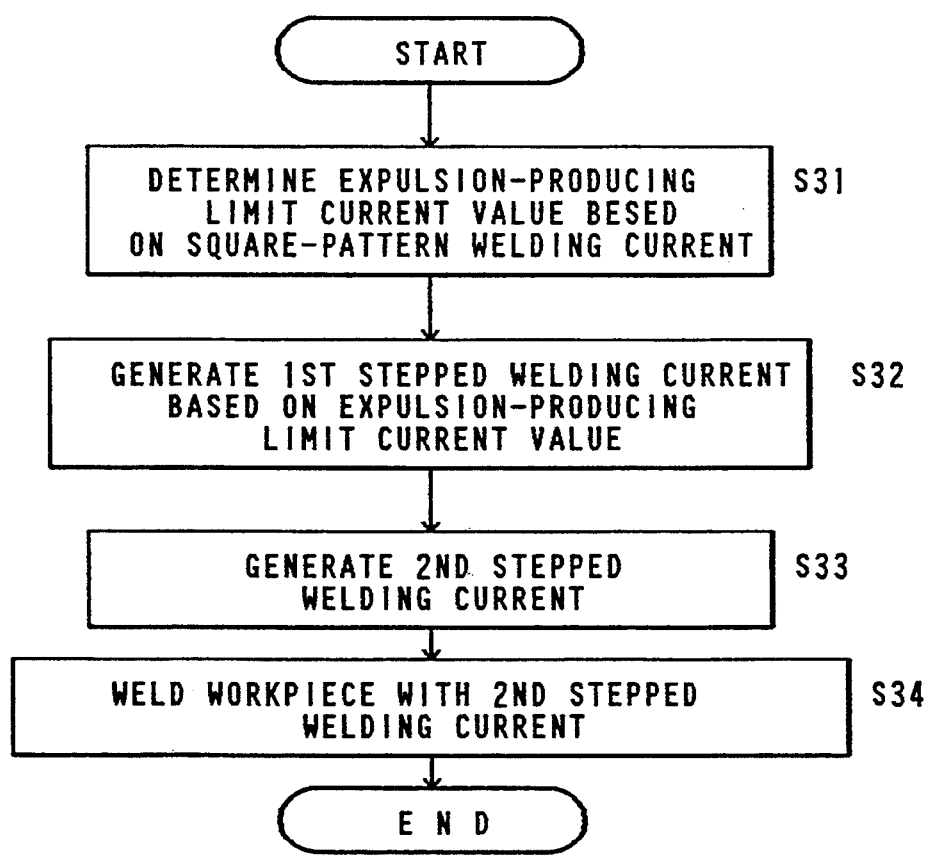
FIG. 12 is a main flowchart of a method of controlling a welding current according to a third embodiment of the present invention.

A method of controlling a welding current in welding the workpiece with a two-step welding current waveform according to a second embodiment of the present invention will be described below with reference to FIGS. 10 and 11.

The method according to the second embodiment is carried out by an inverter-type direct-current resistance welding machine which is essentially the same as the inverter-type direct-current resistance welding machine 20 shown in FIG. 1 except that it additionally has an expulsion-producing limit current memory for storing predetermined expulsion-producing limit currents.

A process of welding the workpiece W successively at a plurality of welding points while varying the time at which the high current $I_H$ starts being supplied in a two-step welding current waveform each time predetermined numbers $n_1$ of successive welding cycles or spots are reached will be described below with reference to FIG. 10.

When the number n of successive welding cycles or spots, e.g., 2000, is entered from the keyboard 36 by the operator in a step S21, the CPU 58 reads a predetermined expulsion-producing limit current $I_{S1}$ for the number n of successive welding cycles or spots, e.g., 2000, from the expulsion-producing limit current memory (see FIG. 11) in a step S22. Then, the CPU 58 adds a predetermined value $I_d$ stored in the setting memory 56 to the read predetermined expulsion-producing limit current $I_{S1}$, producing an average current $I_A$ of two-step welding current waveform in a step S23.

Thereafter, the CPU 58 determines a high current $I_H$ from the welding current supply period T, the high current supply period $t_1$, and the low current $I_L$ stored in the setting memory 56, and produces the two-step welding current waveform as shown in FIG. 9 in a step S24. The CPU 58 generates the welding current waveforms of types 1, 2, 3 shown in FIGS. 3, 4, 5 with their high current supply periods $t_1$ at different times in a step S25. The CPU 58 then establishes different numbers N of successive welding cycles or spots for the respective welding current waveforms of types 1, 2, 3, e.g., $1 < N \leq n_1$ for the welding current waveform of type 1, $n_1 + 1 < N \leq n_2$ for the welding current waveform of type 2, and $n_2 + 1 < N \leq n$ for the welding current waveform of type 3, and stores the established different numbers N in the welding current waveform memory 68.

When a welding process is started, the CPU 58 reads the welding current waveform of type 1 from the welding current waveform memory 68 (see FIG. 3A), and supplies a welding current based on the read welding current waveform of type 1 to the workpiece W in a step S26. The CPU 58 also starts counting the number N of successively welding cycles or spots. The number N of successively welding cycles or spots is counted as the number of times that the welding current waveform information is read from the welding current waveform memory 68.

If the number N of successively welding cycles or spots reaches $n_1$, e.g., 800, in a step S27, then the CPU 58 selects the welding current waveform of type 2 in a step S28. If the number N of successively welding cycles or spots with the welding current waveform of type 2 reaches $n_2$, e.g., 1200, in a step S29, then the CPU 58 selects the welding current waveform of type 3 in a step S30. If the number N of successively welding cycles or spots with the welding current waveform of type 3 reaches 2000 in a step S30-1, then the CPU 58 finishes the welding process.

After the number N of successively welding cycles or spots has reached 2000, the electrode tips 42, 43 may be ground or dressed, and control may return to the step S21.

In the second embodiment, as described above, the two-step welding current waveforms of types 1, 2, 3 with the high current $I_H$ being shifted to respective different locations are generated, and the number N of successive welding cycles or spots is set to different values that are experimentally determined for the respective welding current waveforms of types 1, 2, 3, e.g., $1 \leq N \leq n_1$ for the welding current waveform of type 1, $n_1 + 1 \leq N \leq n_2$ for the welding current waveform of type 2, and $n_2 + 1 \leq N \leq n$ for the welding current waveform of type 3. When the number N of successive welding cycles or spots reaches the respective settings, the welding current waveforms of types 1, 2, 3 are selected to weld the workpiece W successively at a plurality of welding points for a sufficient welding strength.

While the three welding current waveforms of types 1, 2, 3 are employed in this embodiment, a greater number of welding current waveforms may be used to accomplish welded products of higher quality.

3rd Embodiment

A method of controlling a welding current according to a third embodiment of the present invention will be described below with reference to FIGS. 12 through 15. In the third embodiment, the workpiece W is welded with a stepped welding current $I_W$ composed of two current values by the inverter-type direct-current resistance welding machine 20.

First, a welding current $I_W$ (see FIG. 14) having a constant current value (hereinafter referred to as a "square-pattern welding current") is supplied to the workpiece W to weld same, and based on whether expulsions are produced or not, a maximum current value $I_{M1}$ of the square-pattern welding current is increased or reduced to determine an expulsion-producing limit current value $I_{S1}$ in a step S31. Then, a first stepped welding current is generated which has an average current $I_A$ greater than the expulsion-producing limit current value $I_{S1}$ and is composed of a low current $I_L$ that is a predetermined value lower than the expulsion-producing limit current value $I_{S1}$ and a high current $I_H$ that is higher than the expulsion-producing limit current value $I_{S1}$ in a step S32.

The first stepped welding current is supplied to weld the workpiece W, and a second stepped welding current which has a new high current $I_{H1}$ is generated by increasing or reducing the high current $I_H$ based on whether expulsions are produced or not in a step S33.

Then, the second stepped welding current is supplied to weld the workpiece W in a step S34.

Figure 13:
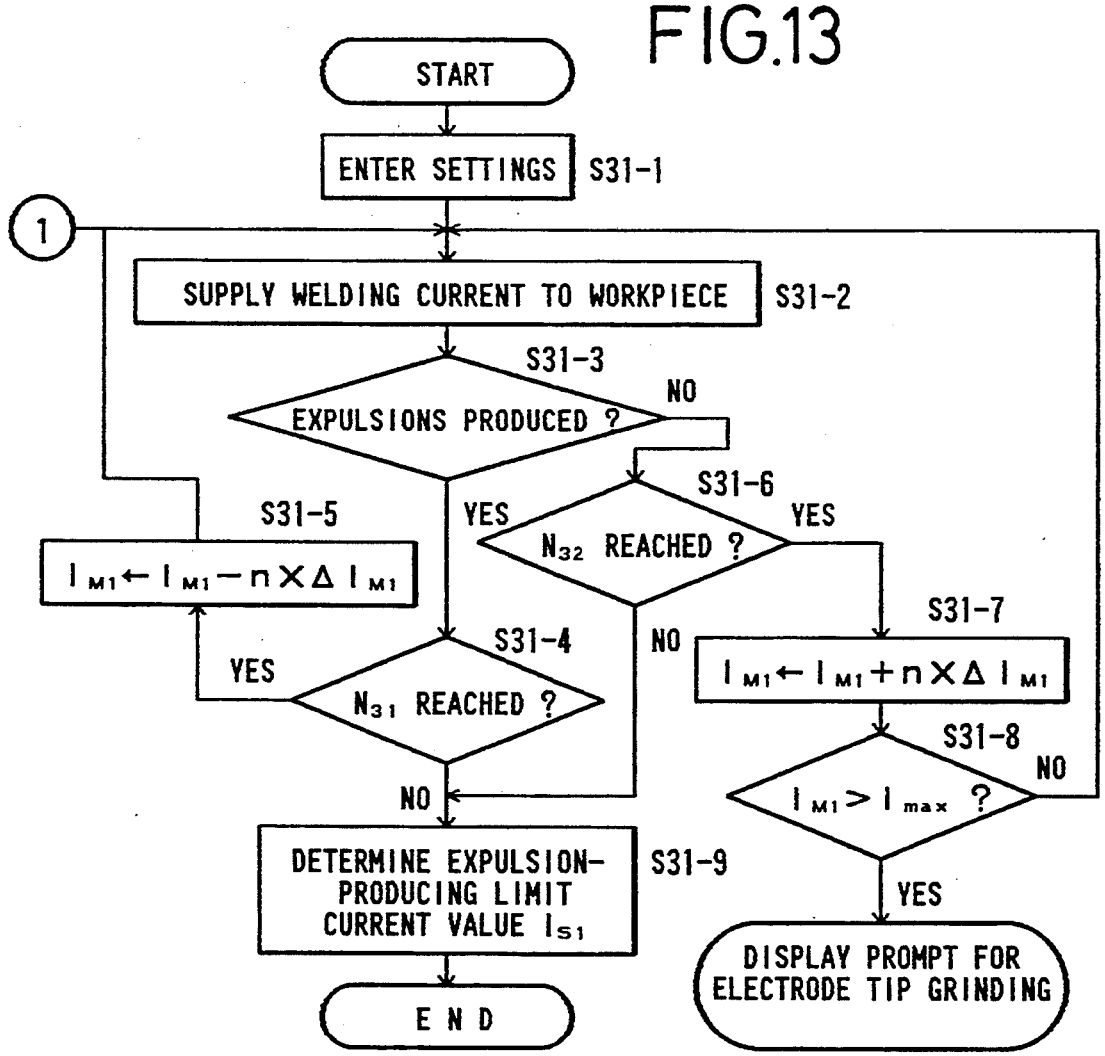
FIG. 13 is a flowchart of a detailed sequence of a step S31 in the main flowchart shown in FIG. 12.

The step S31 of determining the expulsion-producing limit current value $I_{S1}$ will be described in detail with reference to FIG. 13.

Conditions for generating the square-pattern welding current $I_W$ are entered through the keyboard 36 by the operator, and stored in a memory in the welding controller 30 in a step S31-1.

These conditions include:
1. data indicative of detection of expulsions on the workpiece W with the secondary current $I_2$;
2. the welding current supply time T;
3. the pressure P under which the electrode tips 42, 43 grip the workpiece W;
4. the maximum current value $I_{M1}$ of a square-pattern welding current; and
5. a setting $N_{31}$ for determining the number N of successive welding cycles or spots in which expulsions are produced and a setting $N_{32}$ for determining the number N of successive welding cycles or spots in which no expulsions are produced at the time the workpiece W is welded successively at a plurality of welding points.

Figure 14:
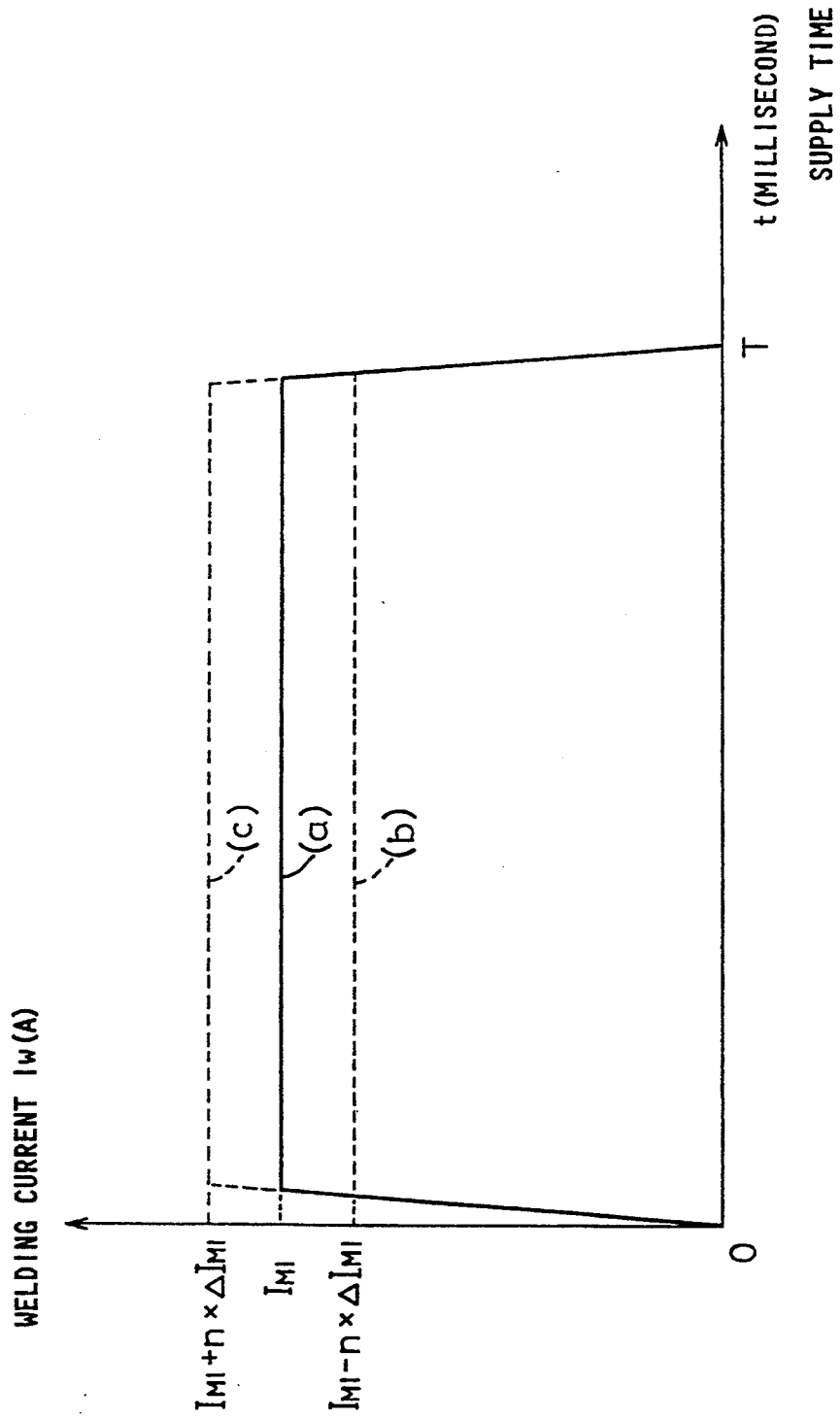
FIG. 14 is a diagram illustrative of a process of determining an expulsion-producing limit current value in the flowchart shown in FIG. 13.

Based on these conditions, the CPU 58 generates a square-pattern welding current (see FIG. 14 at (a)), and supplies the generated square-pattern welding current $I_W$ to the workpiece W to weld same in a step S31-2.

At this time, the CPU 58 reads the secondary current $I_2$ detected by the secondary current detector 34, and determines whether expulsions are produced or not based on the secondary current $I_2$ in a step S31-3. If expulsions are produced, then the CPU 58 determines whether the number N of successive welding cycles in which expulsions are produced has reached a preset value $N_{31}$ or not in a step S31-4.

If the number N of successive welding cycles has reached the preset value $N_{31}$, then the CPU 58 judges the maximum current value $I_{M1}$ as being too high. If this decision step is carried out for the first time, then the CPU 58 substitutes "1" in the variable n in the equation $I_{M1} \leftarrow I_{M1} - n \times \Delta I_{M1}$, and subtracts a corrective quantity $\Delta I_{m1}$ from the maximum current value $I_{M1}$ according to the equation $I_{M1} \leftarrow I_{M1} - n \times \Delta I_{M1}$, thus determining a new maximum current value $I_{m1}$ in a step S31-5. A next welding point is welded with the new maximum current value $I_{M1}$ (see FIG. 14 at (b)).

If no expulsions are produced in the step S31-3, then the CPU 58 determines whether the number N of successive welding cycles in which no expulsions are produced has reached a preset value $N_{32}$ or not in a step S31-6.

If the number N of successive welding cycles in which no expulsions are produced has reached the preset value $N_{32}$, then the CPU 58 judges the maximum current value $I_{M1}$ as being too low. If this decision step is carried out for the first time, then the CPU 58 substitutes "1" in the variable n in the equation $I_{M1} \leftarrow I_{M1} + n \times \Delta I_{M1}$, and adds a corrective quantity $\Delta I_{M1}$ to the maximum current value $I_{M1}$ according to the equation $I_{M1} \leftarrow I_{M1} + n \times \Delta I_{M1}$, thus determining a new maximum current value $I_M$ in a step S31-7.

The CPU 58 then determines whether the new maximum current value $I_{M1}$ is greater than a maximum current value $I_{MAX}$ that can be supplied from the welding transformer 26 or not in a step S31-8. If $I_{M1} > I_{MAX}$, then the CPU 58 judges the electrode tips 42, 43 as being worn, displays a prompt to grind or dress the electrode tips 42, 43 on the CRT 38, and stops supplying the welding current $I_W$. If $I_{M1}$ is not greater than $I_{MAX}$, then a new welding point is welded with a square-pattern welding current $I_W$ whose maximum current value $I_{M1}$ has been calculated in the step S31-7 (see FIG. 14(c)).

If the number N of successive welding cycles in which expulsions are produced has not reached the preset value $N_{31}$ in the step S31-4 or if the number N of successive welding cycles in which no expulsions are produced has not reached the preset value $N_{32}$ in the step S31-6, i.e., if expulsions are occasionally produced, then the CPU 58 judges the workpiece W as being welded with the maximum current value $I_{M1}$ which can achieve a sufficient welding strength. The CPU 58 stores the maximum current value $I_{M1}$ at this time as an expulsion-producing limit current value $I_{S1}$, in the square-pattern welding current $I_W$ in the memory (not shown) in a step S31-9.

Figure 15:
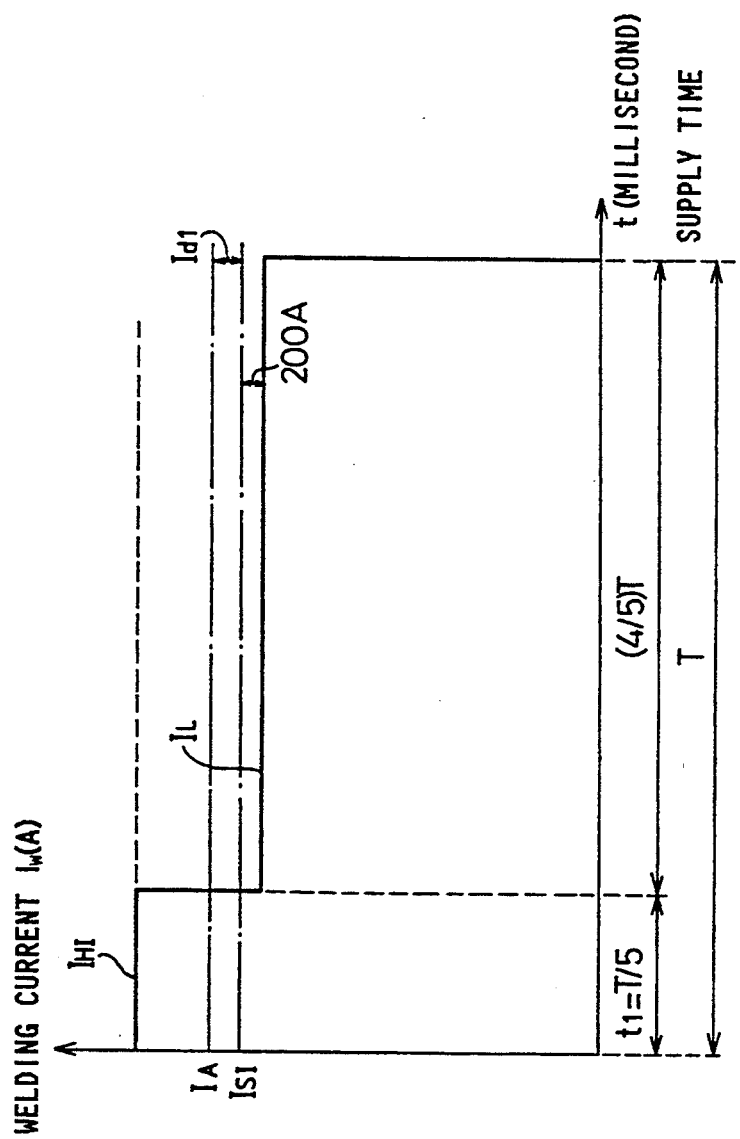
FIG. 15 is a diagram showing the waveform of a two-step welding current that is generated in the method of controlling a welding current according to the third embodiment.

Thereafter, the CPU 58 generates in the step S32 the stepped welding current which is composed of the low current $I_L$ and the high current $I_H$, as shown in FIG. 15, based on the expulsion-producing limit current value $I_{S1}$ stored in the step S31-9.

Figure 16:
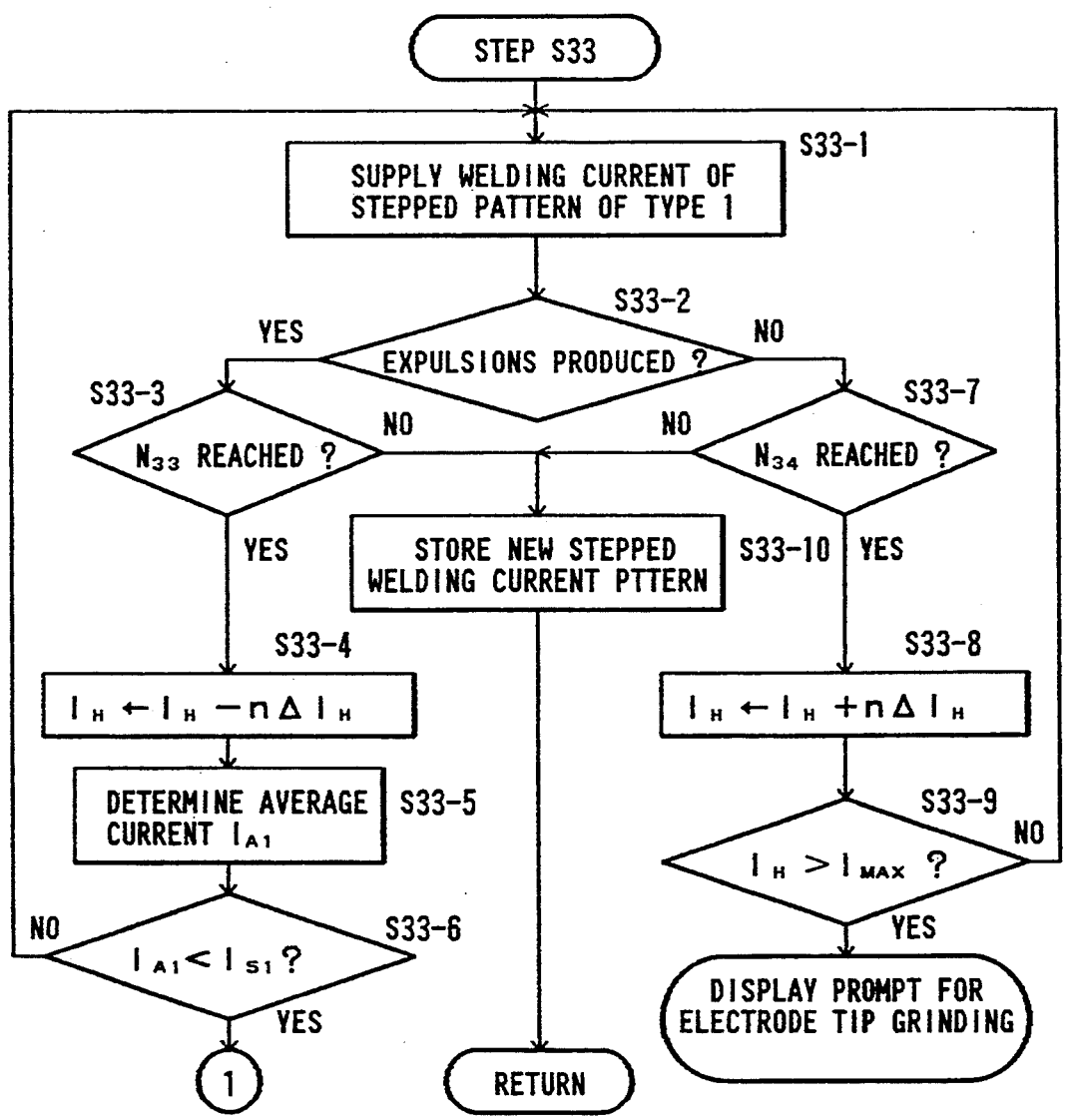
FIG. 16 is a flowchart of a detailed sequence of a step S33 in the main flowchart shown in FIG. 12.

The step S33 of supplying the stepped welding current $I_W$ to the workpiece W and generating the welding current which can achieve an optimum welding strength will be described in detail with reference to FIG. 16.

The CPU 58 supplies the stepped welding current $I_W$ of type 1 generated in the step S32 to the workpiece W in a step S33-1, and determines whether expulsions are produced or not in a step S33-2. If expulsions are produced, then the CPU 58 determines whether the number N of successive welding cycles in which expulsions are produced has reached a preset value $N_{33}$ or not in a step S33-3.

If the number N of successive welding cycles has reached the preset value $N_{33}$, then the CPU 58 judges the high current value $I_H$ of the stepped welding current pattern as being too high. If this decision step is carried out for the first time, then the CPU 58 substitutes "1" in the variable n in the equation $I_H \leftarrow I_H - n \times \Delta I_H$, and subtracts a corrective quantity $\Delta I_H$, e.g., 100 A, from the high current value $I_H$ according to the equation $I_H \leftarrow I_H - n \times \Delta I_H$, thus determining a new high current value $I_H$ in a step S33-4. Then, the CPU 58 determines an average current $I_{A1}$ of the stepped welding current pattern with the new high current $I_H$ in a step S33-5.

The CPU 58 determines whether the average current $I_{A1}$ is lower than the expulsion-producing limit current value $I_{S1}$ of the square welding current pattern in a step S33-6. If $I_{A1} < I_{S1}$, then the CPU 58 judges the expulsion-producing limit current value $I_{S1}$ determined in the step S31 as being not optimum. Control goes back to the step S31-2 to determine an expulsion-producing limit current value $I_{S1}$. If $I_{A1}$ is not lower than $I_{S1}$, then the CPU 58 uses the new high current $I_H$ determined in the step S33-4, and welds a next welding point with a welding current $I_W$ of the new stepped welding current pattern.

If no expulsions are produced in the step S33-2, then the CPU 58 determines whether the number N of successive welding cycles in which no expulsions are produced has reached a preset value $N_{34}$ or not in a step S33-7.

If the number N of successive welding cycles has reached the preset value $N_{34}$, then the CPU 58 judges the high current value $I_H$ as being too low. If this decision step is carried out for the first time, then the CPU 58 substitutes "1" in the variable n in the equation $I_H \leftarrow I_H + n \times \Delta I_H$, and adds a corrective quantity $\Delta I_H$, e.g., 100 A, to the high current value $I_H$ according to the equation $I_H \leftarrow I_H + n \times \Delta I_H$, thus determining a new high current value $I_H$ in a step S33-8. Then, the CPU 58 determines whether the high current $I_H$ is higher than a maximum current $I_{MAX}$ that can be supplied from the welding transformer 26 in a step S33-9. If $I_H > I_{MAX}$, then the CPU 58 displays a prompt to grind or dress the electrode tips 42, 43 on the CRT 38, and stops supplying the welding current $I_W$. If $I_H$ is not greater than $I_{MAX}$, then a new welding point is welded with a welding current $I_W$ of the new stepped welding current pattern including the high current $I_H$ determined in the step S33-8.

If the number N of successive welding cycles in which expulsions are produced has not reached the preset value $N_{33}$ in the step S33-3 or if the number N of successive welding cycles in which no expulsions are produced has not reached the preset value $N_{34}$ in the step S33-7, i.e., if expulsions are occasionally produced, then the CPU 58 judges the workpiece W as being welded with the welding current $I_W$ of stepped welding current pattern which can achieve a sufficient welding strength. The CPU 58 judges the high current $I_H$ at this time as an optimum high current $I_{H1}$, and stores the stepped welding current pattern including this high current $I_{H1}$ as a new welding current pattern in the memory (not shown) in a step S33-10.

Then, a welding current $I_W$ of the stepped welding current pattern including the optimum high current $I_{H1}$ that is stored in the step S33-10 is supplied to the workpiece W, thereby welding the workpiece W in the step S34.

In the third embodiment, as described above, since the workpiece W is welded with the welding current $I_W$ of the stepped welding current pattern including the optimum high current $I_{H1}$, expulsions are prevented from occurring and a sufficient welding strength can be accomplished.

4th Embodiment

A method of controlling a welding current according to a fourth embodiment of the present invention will be described below with reference to FIG. 17. In the fourth embodiment, the workpiece W is welded with a plurality of different stepped welding currents $I_W$.

Figure 17:
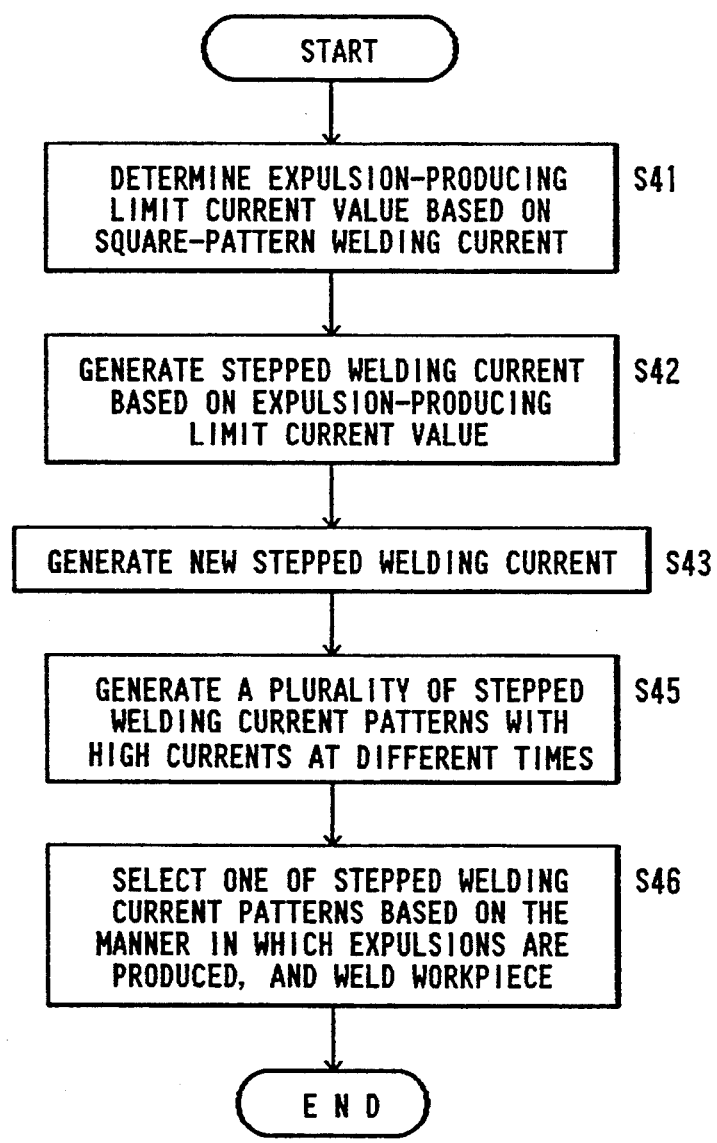
FIG. 17 is a main flowchart of a method of controlling a welding current according to a fourth embodiment of the present invention.
Figure 21:
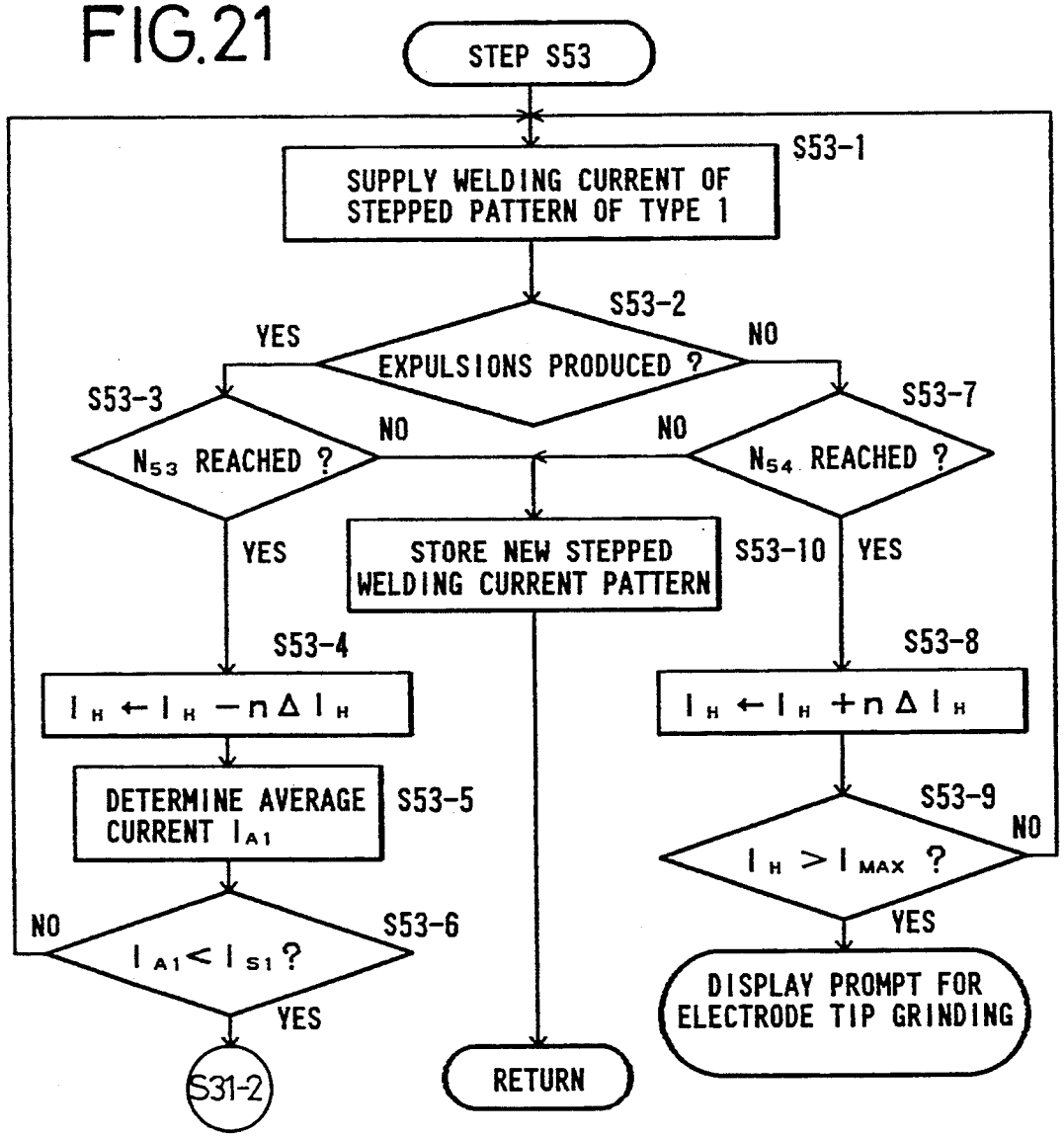
FIG. 21 is a flowchart of a detailed sequence of a step S53 in the main flowchart shown in FIG. 20.
Figure 22:
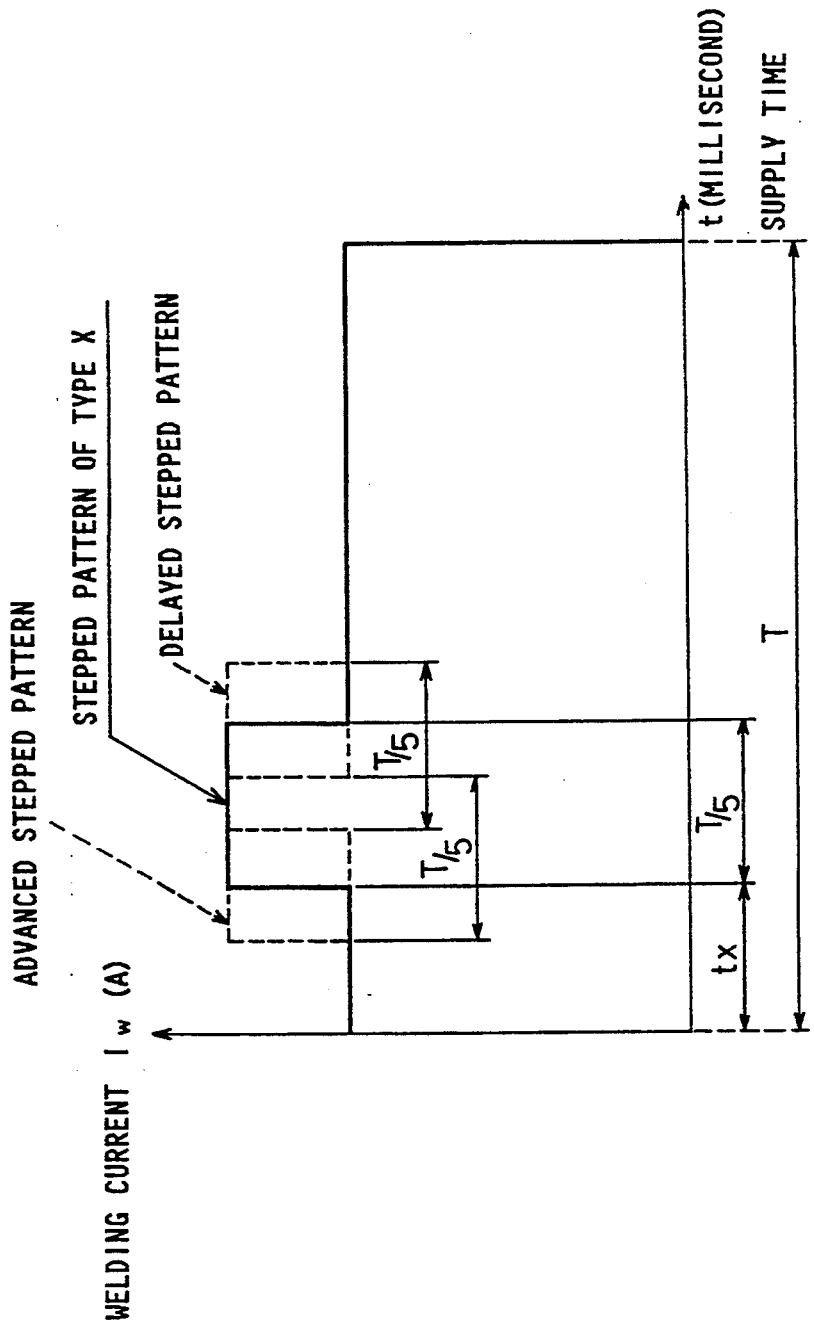
FIG. 22 is a diagram of a stepped current pattern of a type X which is generated in a step S54 in the main flowchart shown in FIG. 20.
Figure 23:
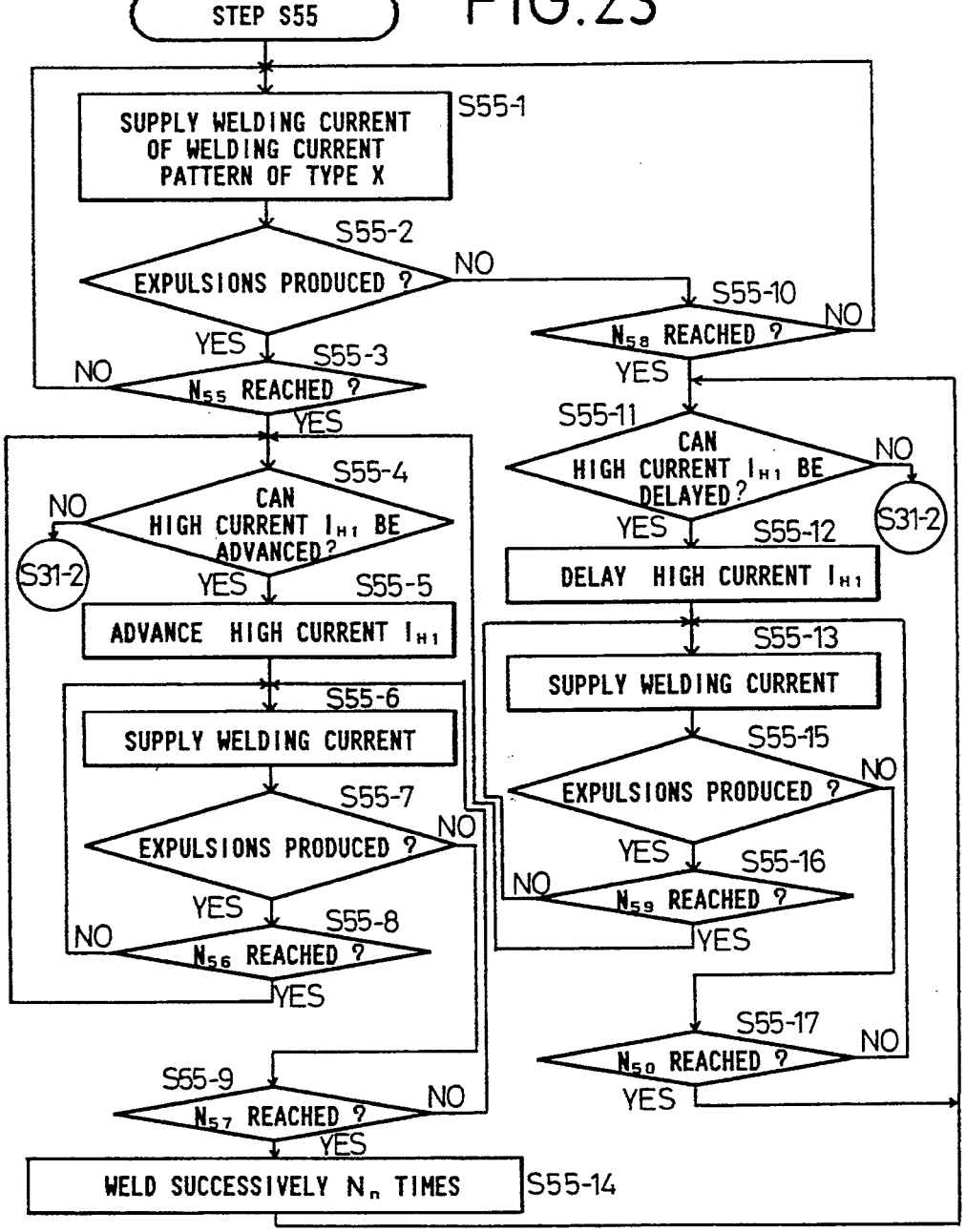
FIG. 23 is a flowchart of a detailed sequence of a step S55 in the main flowchart shown in FIG. 20.

Steps S41–S43 shown in FIG. 17 are identical to the steps S31–S33, respectively, of the third embodiment. After an expulsion-producing limit current value is determined in a step S41 and a stepped welding current including an optimum high current $I_{H1}$ is generated base on the expulsion-producing limit current value in a step S42, a plurality of stepped welding patterns, such as stepped welding current waveforms or patterns of types 1, 2, 3 as shown in FIGS. 18A, 18B, 18C, with their optimum high currents $I_{H1}$ at different times are generated in a step S45. The workpiece W starts being welded with the stepped welding current $I_W$ of type 1 among the stepped welding current waveforms or patterns of types 1, 2, 3. Any one of the stepped welding current waveforms or patterns of types 1, 2, 3 is selected based on whether expulsions are produced or not, and supplied to weld the workpiece W in a step S46.

The step S46 of selecting any one of the stepped welding current waveforms or patterns of types 1, 2, 3 based on whether expulsions are produced or not, and supplying a welding current of the selected stepped welding current pattern to weld the workpiece W will be described in detail with reference to FIG. 19.

The CPU 58 selects the stepped welding current pattern of type 1 in a step S46-1, and supplies a welding current $I_W$ of the selected stepped welding current pattern of type 1 to the workpiece W in a step S46-2. Then, the CPU 58 determines whether expulsions are produced or not based on the secondary current $I_2$ detected by the secondary current detector 34 in a step S46-3.

If expulsions are produced, then the CPU 58 determines whether the number N of successive welding cycles in which expulsions are produced has reached a preset value $N_{45}$ or not in a step S46-4. If the number N of successive welding cycles has not reached the preset value $N_{45}$, then the CPU 58 judges the expulsions as being produced by dust or the like that has entered between the electrode tips 42, 43 and the workpiece W, and continuously welds the workpiece W with the stepped welding current pattern of type 1 in the step S46-2. If the number N of successive welding cycles has reached the preset value $N_{45}$, then the CPU 58 judges the high current $I_{H1}$ as being too high, and executes the step S31-2 and following steps in the third embodiment to determine an optimum high current $I_{H1}$.

If no expulsions are produced in the step S46-3, then the CPU 58 determines whether the number N of successive welding cycles in which no expulsions are produced has reached a preset value $N_{46}$ or not in a step S46-5. If the number N of successive welding cycles has not reached the preset value $N_{46}$, then the CPU 58 judges expulsions as being occasionally produced, i.e., judges the workpiece W as being welded with the stepped welding current $I_W$ which can achieve a sufficient welding strength, and keeps welding the workpiece W with the stepped welding current $I_W$ of type 1 in the step S46-2. If the number N of successive welding cycles has reached the preset value $N_{46}$ in the step S46-5, then the CPU 58 judges the stepped welding current $I_W$ of type 1 as being unsuitable, and reads the stepped welding current $I_W$ of type 2 to weld the workpiece W in a step S46-6.

Thereafter, the CPU 58 determines whether expulsions are produced or not with the stepped welding current $I_W$ of type 2 in a step S46-7. If expulsions are produced, then the CPU 58 determines whether the number N of successive welding cycles in which expulsions are produced has reached a preset value $N_{47}$ or not in a step S46-8. If the number N of successive welding cycles has not reached the preset value $N_{47}$, then the CPU 58 judges the workpiece W as being welded with the stepped welding current $I_W$ which can achieve a sufficient welding strength, and continuously welds the workpiece W with the stepped welding current pattern of type 2 in the step S46-6. If the number N of successive welding cycles has reached the preset value $N_{47}$, then the CPU 58 judges the high current $I_{H1}$ as being late, and supplies the stepped welding current $I_W$ of type 1 to weld the workpiece W in the step S46-1.

If no expulsions are produced in the step S46-7, then the CPU 58 determines whether the number N of successive welding cycles in which no expulsions are produced has reached a preset value $N_{48}$ or not in a step S46-9. If the number N of successive welding cycles has not reached the preset value $N_{48}$, then the CPU 58 judges expulsions as being occasionally produced, i.e., judges the workpiece W as being welded with the stepped welding current $I_W$ which can achieve a sufficient welding strength, and keeps welding the workpiece W with the stepped welding current $I_W$ of type 2 in the step S46-2. If the number N of successive welding cycles has reached the preset value $N_{48}$ in the step S46-9, then the CPU 58 judges the high current $I_H$ as being early, and reads the stepped welding current $I_W$ of type 3 to weld the workpiece W in a step S46-10.

Thereafter, the CPU 58 determines whether expulsions are produced or not with the stepped welding current $I_W$ of type 3 in a step S46-11. If expulsions are produced, then the CPU 58 determines whether the number N of successive welding cycles in which expulsions are produced has reached a preset value $N_{49}$ or not in a step S46-12. If the number N of successive welding cycles has not reached the preset value $N_{49}$, then the CPU 58 judges expulsions as being occasionally produced, i.e., judges the workpiece W as being welded with the stepped welding current $I_W$ which can achieve a sufficient welding strength, and continuously welds the workpiece W with the stepped welding current pattern of type 3 in the step S46-10.

If the number N of successive welding cycles has reached the preset value $N_{49}$, then the CPU 58 judges the stepped welding current pattern of type 3 as being inappropriate, and welds the workpiece W with the stepped welding current $I_W$ of type 2 in the step S46-6.

If no expulsions are produced in the step S46-11, then the CPU 58 determines whether the number N of successive welding cycles in which no expulsions are produced has reached a preset value $N_{40}$ or not in a step S46-13. If the number N of successive welding cycles has not reached the preset value $N_{40}$, then the CPU 58 judges expulsions as being occasionally produced, i.e., judges the workpiece W as being welded with the stepped welding current $I_W$ which can achieve a sufficient welding strength, and keeps welding the workpiece W with the stepped welding current $I_W$ of type 3 in the step S46-10. If the number N of successive welding cycles has reached the preset value $N_{40}$ in the step S46-13, then the CPU 58 judges the high current $I_{H1}$ as being not optimum, and reads executes the step S31-2 and following steps to determine an optimum high current $I_{H1}$ again.

In the step S46, as described above, when the workpiece W is to be welded successively at a plurality of welding points, any one of the stepped welding current patterns of types 1, 2, 3 is selected dependent on the manner in which expulsions are produced, and the workpiece W is welded with a welding current of the selected stepped welding current pattern.

If the number N of successive welding cycles has reached the preset value $N_{46}$ in the step S46-5, or if the number N of successive welding cycles has reached the preset value $N_{48}$ in the step S46-9, or if the number N of successive welding cycles has reached the preset value $N_{40}$ in the step S46-13, then the next step may be executed after the workpiece W is welded a predetermined number of times with the welding current $I_W$ of the corresponding stepped welding current pattern. Such a modified process is also effective to prevent expulsions from being produced and also to achieve a stable and sufficient welding strength.

When the workpiece W is welded with a supplied welding current $I_W$ of a stepped welding current pattern composed of the high and low currents $I_H$, $I_L$, the time at which the high current $I_H$ is generated may be varied within the welding current supply period T even if the average current $I_A$ and the high current supply period $t_1$ remain the same. It has been experimentally confirmed that this control mode is effective to prevent expulsions from being produced and good nuggets can be formed.

It has also been experimentally confirmed that during an initial period of time of a process of successively welding a plurality of welding points, the high current $I_H$ may be supplied initially in the welding current supply period T, and the time at which the high current $I_H$ is generated may be shifted toward the end of the welding current supply period T as the number N of successive welding cycles or spots increases for accomplishing a stable and sufficient welding strength (see FIGS. 18A through 18C, 4 through 6).

The current waveform type 1 shown in FIG. 18A is a stepped pattern in which the high current $I_H$ is supplied initially in the welding current supply period T, in the type 2 shown in FIG. 18B, the high current $I_H$ is supplied in the middle stage of the welding current supply period T, and in the type 3 shown in FIG. 18B, the high current $I_H$ is supplied in the final stage of the welding current supply period T.

It has also been experimentally confirmed that the high current supply period $t_1$ is preferably about 1/5 of the welding current supply period T, and if the high current supply period $t_1$ were much longer than 1/5 of the welding current supply period T, many expulsions would be produced regardless of the number of welding spots, and if the high current supply period $t_1$ were much shorter than 1/5 of the welding current supply period T, no appreciable welding strength difference would be obtained even when the time at which the high current $I_H$ is generated is shifted.

Based on the results of the above experiments, the stepped welding current patterns of types 1, 2, 3 with their high currents $I_{H1}$ generated at different times are generated in the step S45, and any one of the stepped welding current patterns of types 1, 2, 3 is selected based on whether expulsions are produced or not, and supplied to weld the workpiece W in the step S46. In the step S46, therefore, the workpiece W is welded with a welding current $I_W$ having a stepped welding current pattern with its high current $I_{H1}$ generated at an optimum time.

In the fourth embodiment, as described above, an expulsion-producing limit current value $I_{S1}$, is determined by supplying a square-pattern welding current $I_W$, and a stepped welding current pattern having an average current $I_{A1}$ higher than the expulsion-producing limit current value $I_{S1}$ is generated. Then, based on whether expulsions are produced or not, the high current $I_H$ of the stepped welding current pattern is increased or reduced to determine a stepped welding current pattern having an optimum high current $I_{H1}$. Thereafter, a welding current $I_W$ of the determined stepped welding current pattern is supplied to weld the workpiece W. In this manner, expulsions are prevented from being produced, and a sufficient welding strength can be achieved.

Furthermore, stepped welding current patterns of types 1, 2, 3 with their high currents $I_{H1}$ generated at different times are generated, and the workpiece W starts being welded with a welding current $I_W$ having the stepped welding current pattern of type 1. At this time, depending on the manner in which expulsions are produced, the stepped welding current pattern of type 2 or 3 is selected, and a welding current $I_W$ of the selected stepped welding current pattern is supplied to weld the workpiece W for a stable and sufficient welding strength.

In the fourth embodiment, expulsions are detected based on the secondary current $I_2$. However, expulsions may be detected based on the primary current $I_1$, the voltage between the electrode tips 42, 43, the displacement of the electrode tips 42, 43, the acceleration of displacement of the electrode tips 42, 43, acoustic emission, or the like. While in the fourth embodiment any one of the stepped welding current patterns of types 1, 2, 3 is selected based on the manner in which expulsions are produced, a detailed lookup table of data relative to the manner in which expulsions are produced and the times at which the high current $I_{H1}$ is generated may be stored in the welding controller 30, and the lookup table may be referred to based on the manner in which expulsions are produced to continuously control the time at which the high current $I_{H1}$ is generated for more accurately controlling the welding current.

5th Embodiment

A method of controlling a welding current according to a fifth embodiment of the present invention will be described below with reference to FIGS. 20 through 23. In the fifth embodiment, the workpiece W is welded with a stepped welding current $I_W$ by the inverter-type direct-current resistance welding machine 20.

The flowchart shown in FIG. 20 contains steps S51, S52 which are identical to the corresponding steps S31, S32 described above with respect to the third embodiment. Therefore, these steps S51, S52 will not be described in detail below.

In a step S53 shown in FIG. 20, the workpiece W is welded with the stepped welding current $I_W$ generated in the step S52, and a stepped welding current which can achieve an optimum welding strength is generated. The step S53 will be described in detail with reference to FIG. 21.

The CPU 58 supplies the stepped welding current $I_W$ of type 1 generated in the step S52 to the workpiece W in a step S53-1, and determines whether expulsions are produced or not in a step S53-2. If expulsions are produced, then the CPU 58 determines whether the number N of successive welding cycles in which expulsions are produced has reached a preset value $N_{53}$ or not in a step S53-3.

If the number N of successive welding cycles has reached the preset value $N_{53}$, then the CPU 58 judges the high current value $I_H$ of the stepped welding current pattern as being too high. If this decision step is carried out for the first time, then the CPU 58 substitutes "1" in the variable n in the equation $I_H \leftarrow I_H - n \times \Delta I_H$, and subtracts a corrective quantity $\Delta I_H$, e.g., 100 A, from the high current value $I_H$ according to the equation $I_H \leftarrow I_H - n \times \Delta I_H$, thus determining a new high current value $I_H$ in a step S53-4. Then, the CPU 58 determines an average current $I_{A1}$ of the stepped welding current pattern with the new high current $I_H$ in a step S53-5.

The CPU 58 determines whether the average current $I_{A1}$ is lower than the expulsion-producing limit current value $I_{S1}$, of the square welding current pattern in a step S53-6. If $I_{A1} < I_{S1}$, then the CPU 58 judges the expulsion-producing limit current value $I_{S1}$, determined in the step S51 as being not optimum. Control goes back to the step S31-2 to determine an expulsion-producing limit current value $I_{S1}$. If $I_{A1}$ is not lower than $I_{S1}$, then the CPU 58 uses the new high current $I_H$ determined in the step S53-4, and welds a next welding point with a welding current $I_W$ of the new stepped welding current pattern.

If no expulsions are produced in the step S53-2, then the CPU 58 determines whether the number N of successive welding cycles in which no expulsions are produced has reached a preset value $N_{54}$ or not in a step S53-7.

If the number N of successive welding cycles has reached the preset value $N_{54}$, then the CPU 58 judges the high current value $I_H$ as being too low. If this decision step is carried out for the first time, then the CPU 58 substitutes "1" in the variable n in the equation $I_H \leftarrow I_H + n \times \Delta I_H$, and adds a corrective quantity $\Delta I_H$, e.g., 100 A, to the high current value $I_H$ according to the equation $I_H \leftarrow I_H + n \times \Delta I_H$, thus determining a new high current value $I_H$ in a step S53-8. Then, the CPU 58 determines whether the high current $I_H$ is higher than a maximum current $I_{MAX}$ that can be supplied from the welding transformer 26 in a step S53-9. If $I_H > I_{MAX}$, then the CPU 58 displays a prompt to grind or dress the electrode tips 42, 43 on the CRT 38, and stops supplying the welding current $I_W$. If $I_H$ is not greater than $I_{MAX}$, then a new welding point is welded with a welding current $I_W$ of the new stepped welding current pattern including the high current $I_H$ determined in the step S53-8.

If the number N of successive welding cycles in which expulsions are produced has not reached the preset value $N_{53}$ in the step S53-3 or if the number N of successive welding cycles in which no expulsions are produced has not reached the preset value $N_{54}$ in the step S53-7, i.e., if expulsions are occasionally produced, then the CPU 58 judges the workpiece W as being welded with the welding current $I_W$ of stepped welding current pattern which can achieve a sufficient welding strength. The CPU 58 judges the high current $I_H$ at this time as an optimum high current $I_{H1}$, and stores the stepped welding current pattern including this high current $I_{H1}$ as a new welding current pattern in the memory (not shown) in a step S53-10.

Then, a stepped pattern of a welding current to be supplied at first when the workpiece W is welded with a welding current $I_W$ of a stepped welding current pattern is generated in a step S54.

The generated stepped welding current pattern is a stepped welding pattern of type X (see FIG. 22) in which the high current $I_{H1}$ of the new stepped pattern generated in the step S53 is delayed from the time at which the welding current starts being supplied, by a predetermined time $t_x$ which is experimentally determined.

A welding current $I_W$ having the stepped welding pattern of type X generated in the step S54 is supplied to the workpiece W initially in the welding process to weld the workpiece W in a step S55. The step S55 will be described in detail below with reference to FIG. 23.

A welding current $I_W$ having the stepped welding current pattern of type X is supplied to the workpiece W in a step S55-1. The CPU 58 determines whether expulsions are produced or not based on the secondary current $I_2$ detected by the secondary current detector 34 in a step S55-2. If expulsions are produced, then the CPU 58 determines whether the number N of successive welding cycles in which expulsions are produced has reached a preset value $N_{55}$ or not in a step S55-3. If the number N of successive welding cycles has not reached the preset value $N_{55}$, then the CPU 58 judges the expulsions as being produced by dust or the like that has entered between the electrode tips 42, 43 and the workpiece W, and continuously welds the workpiece W with the stepped welding current pattern of type X in the step S55-1.

If the number N of successive welding cycles has reached the preset value $N_{55}$, then the CPU 58 judges the high current $I_{H1}$ as being late, and determines whether the time at which the high current $I_{H1}$ is supplied can be advanced or not in a step S55-4. If it can be advanced, then the CPU 58 advances the time at which the high current $I_{H1}$ is supplied without varying the high current supply period (T/5) and the welding current supply period T (see FIG. 22) in a step S55-5. The CPU 58 then supplies a welding current $I_W$ of this stepped welding current pattern to the workpiece W to weld same in a step S55-6.

If the time at which the high current $I_{H1}$ is supplied cannot be advanced in the step S55-4, then the CPU 58 judges the high current $I_{H1}$ as being too high, and executes the step S31-2 and following steps in the third embodiment.

The CPU 58 determines whether expulsions are produced or not with the advanced welding current $I_W$ in a step S55-7. If expulsions are produced, then the CPU 58 determines whether the number N of successive welding cycles in which expulsions are produced has reached a preset value $N_{56}$ or not in a step S55-8. If the number N of successive welding cycles has not reached the preset value $N_{56}$, then the CPU 58 judges the expulsions as being abruptly produced, and continuously welds the workpiece W with the welding current $I_W$ of the stepped welding current pattern having the advanced high current $I_H$ in the step S55-6. If the number N of successive welding cycles has reached the preset value $N_{56}$, then the CPU 58 determines whether the time at which the high current $I_{H1}$ is supplied can be advanced or not in the step S55-4.

If no expulsions are produced in the step S55-7, then the CPU 58 determines whether the number N of successive welding cycles in which no expulsions are produced has reached a preset value $N_{57}$ or not in a step S55-9. If the number N of successive welding cycles has not reached the preset value $N_{57}$, then the CPU 58 judges the expulsions as being occasionally produced, i.e., judges the workpiece W as being welded with the welding current $I_W$ of the stepped welding current pattern with the high current $I_{H1}$ supplied at an appropriate time, and repeats the step S55-6 to continue to weld the workpiece W with the welding current $I_W$ of this stepped welding current pattern.

If no expulsions are produced in the step S55-2, then the CPU 58 determines whether the number N of successive welding cycles in which no expulsions are produced has reached a preset value $N_{58}$ or not in a step S55-10. If the number N of successive welding cycles has not reached the preset value $N_{58}$, then the CPU 58 judges expulsions as being occasionally produced, i.e., judges the workpiece W as being welded with the stepped welding current $I_W$ which can achieve a sufficient welding strength, and keeps welding the workpiece W with the stepped welding current $I_W$ of type X in the step S55-1.

If the number N of successive welding cycles has reached the preset value $N_{58}$ in the step S55-10, then the CPU 58 judges the high current $I_H$ as being early, and determines whether the time at which the high current $I_{H1}$ is supplied can be delayed or not in a step S55-11. If it can be delayed, then the CPU 58 delays the time at which the high current $I_{H1}$ is supplied by a predetermined period of time in a step S55-12 (see FIG. 22). The CPU 58 then supplies a welding current $I_W$ of the delayed stepped welding current pattern to the workpiece W to weld same in a step S55-13.

If the time at which the high current $I_{H1}$ is supplied cannot be delayed in the step S55-11, then the CPU 58 judges the high current $I_{H1}$ as being too low, and executes the step S31-2 and following steps in the third embodiment.

If the number N of successive welding cycles has reached the preset value $N_{57}$ in the step S55-9, then the CPU 58 welds the workpiece W in a predetermined number $N_n$ of welding cycles to increase the number of welding spots in the preset stepped welding current pattern in a step S55-14. Thereafter, the CPU 58 determines whether the time at which the high current $I_{H1}$ is supplied can be delayed or not in the step S55-11.

Then, the CPU 58 determines whether expulsions are produced or not with the delayed welding current $I_W$ in a step S55-15. If expulsions are produced, then the CPU 58 determines whether the number N of successive welding cycles in which expulsions are produced has reached a preset value $N_{59}$ or not in a step S55-16. If the number N of successive welding cycles has not reached the preset value $N_{59}$, then the CPU 58 judges the expulsions as being abruptly produced, and repeats the step S55-13 to continuously weld the workpiece W with the welding current $I_W$ of the stepped welding current pattern having the delayed high current $I_{H1}$. If the number N of successive welding cycles has reached the preset value $N_{59}$ in the step S55-16, then the CPU 58 determines whether the time at which the high current $I_{H1}$ is supplied can be advanced or not in the step S55-4.

If no expulsions are produced in the step S55-15, then the CPU 58 determines whether the number N of successive welding cycles in which no expulsions are produced has reached a preset value $N_{50}$ or not in a step S55-17. If the number N of successive welding cycles has not reached the preset value $N_{50}$, then the CPU 58 judges the expulsions as being occasionally produced, i.e., judges the workpiece W as being welded with the welding current $I_W$ of the stepped welding current pattern with the high current $I_{H1}$ supplied at an appropriate time, and repeats the step S55-13 to continue to weld the workpiece W with the welding current $I_W$ of this stepped welding current pattern.

If the number N of successive welding cycles has reached the preset value $N_{50}$ in the step S55-17, then the CPU 58 determines whether the time at which the high current $I_{H1}$ is supplied can be delayed or not in the step S55-11.

Through the above steps, a stepped welding current pattern with the high current $I_{H1}$ supplied at an appropriate time is generated, and a welding current of the generated stepped welding current pattern is supplied to the workpiece W to weld same.

When the workpiece W is welded with a supplied welding current $I_W$ of a stepped welding current pattern composed of the high and low currents $I_H$, $I_L$, the time at which the high current $I_H$ is generated may be varied within the welding current supply period T even if the average current $I_A$ and the high current supply period $t_1$ remain the same. It has been experimentally confirmed that this control mode is effective to prevent expulsions from being produced and good nuggets can be formed.

It has also been experimentally confirmed that during an initial period of time of a process of successively welding a plurality of welding points, the high current $I_H$ may be supplied initially in the welding current supply period T, and the time at which the high current $I_H$ is generated may be shifted toward the end of the welding current supply period T as the number N of successive welding cycles or spots increases for accomplishing a stable and sufficient welding strength.

The stepped welding current patterns used in the above experiments are identical to those shown in FIGS. 18A through 18C, and the welding results achieved by these stepped welding current patterns are the same as those shown in FIGS. 4 through 6.

Based on the results of the above experiments, the stepped welding current pattern of type X in which the time at which the high current $I_{H1}$ is supplied is delayed from the time at which the welding current starts being supplied by the predetermined time $t_x$ is generated in the step S54, and the workpiece W starts to be welded with the welding current $I_W$ of the stepped welding current pattern of type X in the step S55. In the step S55, furthermore, the stepped welding current pattern in which the time at which the high current $I_{H1}$ is supplied is shifted within the welding current supply period T depending on whether expulsions are produced or not is generated, and the welding current $I_W$ of this stepped welding current pattern is supplied to weld the workpiece W.

In the step S55, therefore, a sufficient welding strength can be achieved from the start of the welding process, and the workpiece W can be welded with a stepped welding current $I_W$ with a high current $I_{H1}$ supplied at an optimum time.

While in the fifth embodiment a stepped welding current pattern in which the time at which the high current $I_{H1}$ is supplied is delayed or advanced by a predetermined time based on the manner in which expulsions are produced is generated, a plurality of stepped welding current patterns with respective high currents $I_{H1}$ supplied at respective different times, or a detailed lookup table of data relative to the manner in which expulsions are produced and the times at which the high current $I_{H1}$ is generated, may be stored in the welding controller 30, for more accurately controlling the welding current.

In the fifth embodiment, expulsions are detected based on the secondary current $I_2$. However, expulsions may be detected based on the primary current $I_1$, the voltage between the electrode tips 42, 43, the displacement of the electrode tips 42, 43, the acceleration of displacement of the electrode tips 42, 43, acoustic emission, or the like.

6th Embodiment

A method of controlling a welding current according to a sixth embodiment of the present invention will be described below with reference to FIGS. 24 through 28. In the sixth embodiment, the workpiece W is welded at a predetermined number of welding points with a square-pattern welding current $I_W$, and then with a stepped welding current composed of two current values by the inverter-type direct-current resistance welding machine 20.

Figure 24:
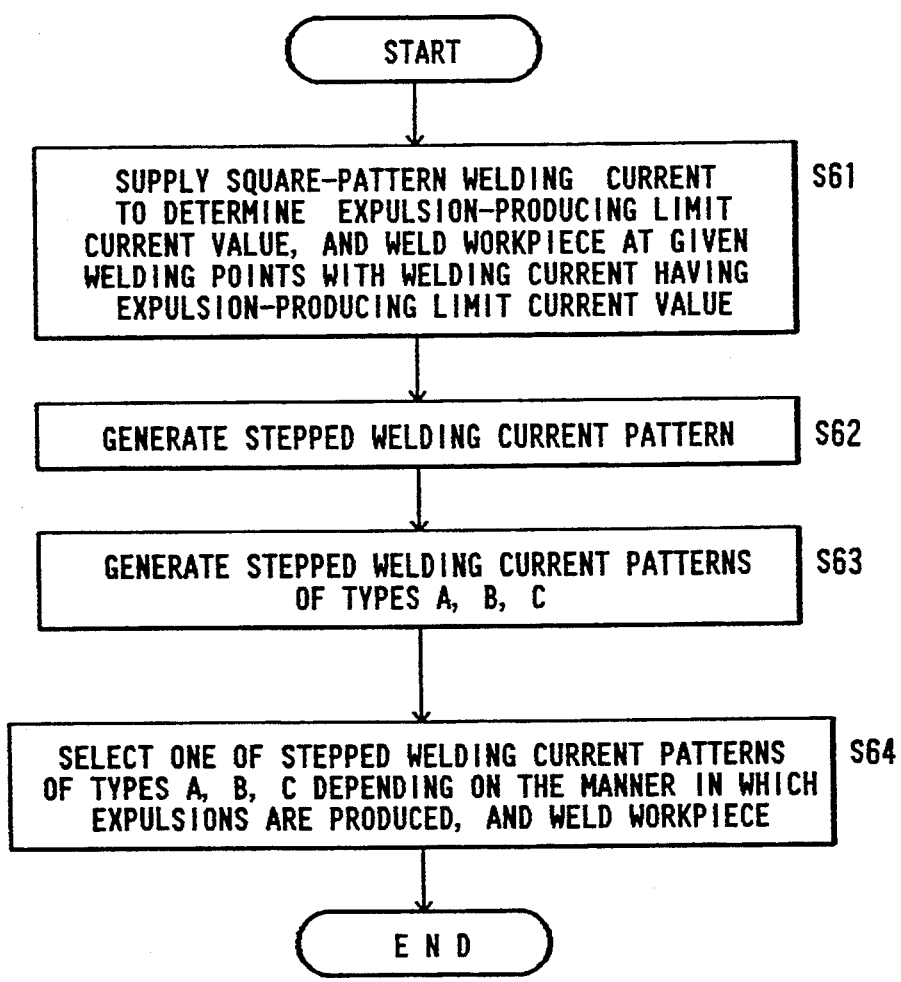
FIG. 24 is a main flowchart of a method of controlling welding current according to a sixth embodiment of the present invention.

The method according to the sixth embodiment will be described below with reference to FIG. 24. In a step S61 shown in FIG. 24, the workpiece W is welded with a square-pattern welding current $I_W$, an expulsion-producing limit current value $I_{S1}$, is determined based on the manner in which expulsions are produced, and the workpiece W is welded at a predetermined number of welding spots with a square-pattern welding current $I_W$ which has the expulsion-producing limit current value $I_{S1}$ as a current value $I_M$.

In a next step S62, a stepped welding current is generated which has a welding current pattern having an average current $I_A$ higher than the expulsion-producing limit current value $I_{S1}$ determined in the step S61 and composed of a low current $I_L$ that is lower than the expulsion-producing limit current value $I_{S1}$ by a preset value and a high current $I_H$ that is higher than the expulsion-producing limit current value $I_{S1}$, by a preset value.

In a step S63, a plurality of stepped welding current patterns of types A, B, C, for example, with their high currents $I_H$ supplied at different times within a welding current supply period T are generated. In a step S64, the workpiece W is welded with welding currents $I_W$ of the respective stepped welding current patterns. In the welding process, one of the stepped welding current patterns of types A, B, C is selected depending on the manner in which expulsions are produced, and the workpiece W is continuously welded with a welding current $I_W$ of the selected stepped welding current pattern.

Figure 25:
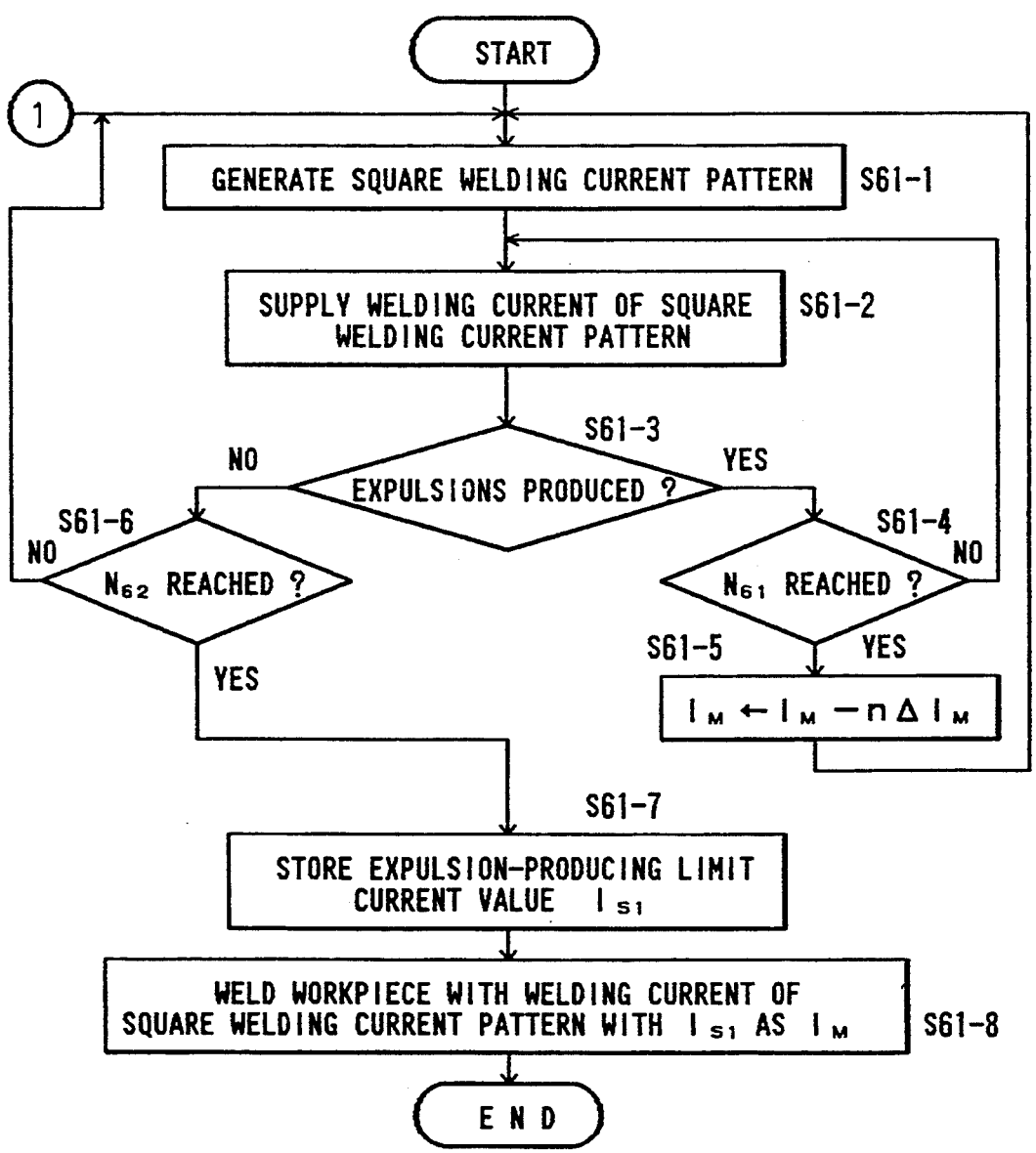
FIG. 25 is a flowchart of a detailed sequence of a step S61 in the main flowchart shown in FIG. 22.

The step S61 will be described in detail below with reference to FIG. 25.

When a signal indicative of the start of a welding process is entered from the keyboard 36, the welding controller 30 outputs a valve shift signal to shift the valve body of the solenoid-operated on/off valve 46 to introduce a pneumatic pressure from the pneumatic pressure source 48 therethrough to the pneumatic cylinder 44. The pneumatic cylinder 44 is then actuated to close the movable gun arms 40, 41 to cause the electrode tips 42, 43 to grip the workpiece W therebetween.

Figure 26:
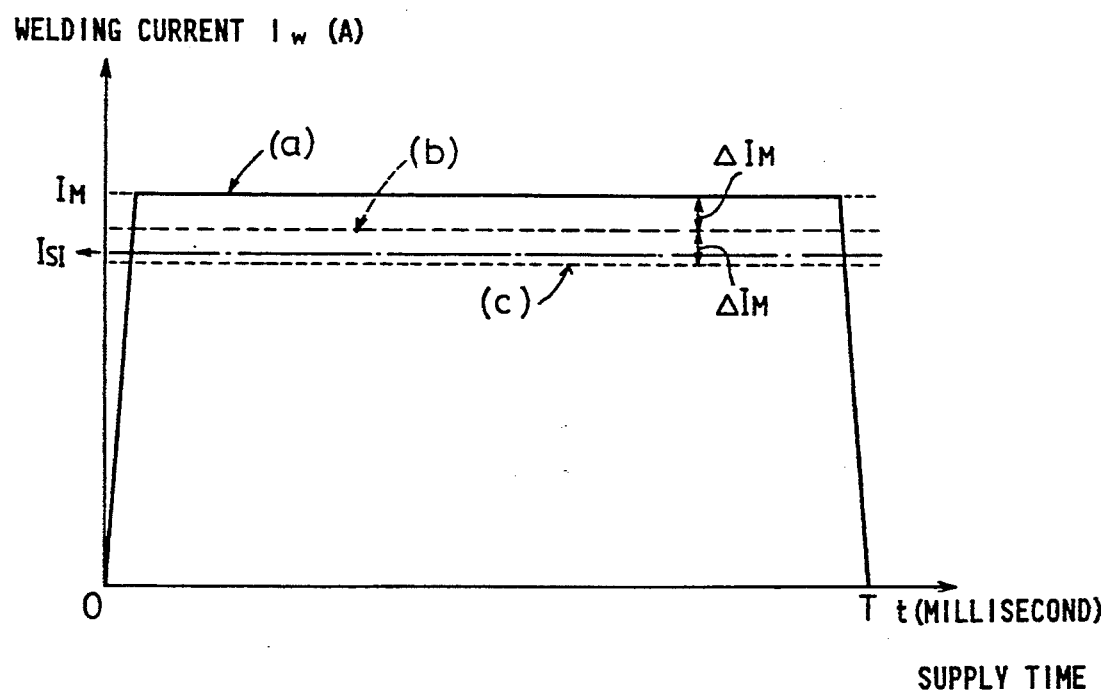
FIG. 26 is a diagram of a square-pattern welding current generated in the step S61.

Then, the CPU 58 of the welding controller 30 reads a welding current supply time T and a current value $I_M$ for generating a square welding current pattern, which have been entered from the keyboard 36 by the operator, and generates a square welding current pattern from the welding current supply time T and the current value $I_M$ (see FIG. 26 at (a)) in a step S61-1. The CPU 58 outputs a signal S to the inverter 24 to supply a welding current $I_W$ of the generated square welding current pattern to the workpiece W. In response to the signal S, the inverter 24 generates a high-frequency signal $S_f$, and supplies the high-frequency signal $S_f$ to the welding transformer 26.

The welding transformer 26 transforms and rectifies the high-frequency signal $S_f$ into a welding current $I_W$, which is supplied to the workpiece W in a step S61-2.

The CPU 58 reads the welding current $I_W$ detected by the secondary current detector 34, and determines whether expulsions are produced or not in a step S61-3.

Since an initial value of the current value $I_M$ is sufficiently large with respect to an expulsion-producing limit current value $I_{S1}$, expulsions are produced in an initial period of the welding process.

If expulsions are produced, then the CPU 58 determines whether the number N of successive welding cycles in which expulsions are produced has reached a preset value $N_{61}$ or not in a step S61-4. If the number N of successive welding cycles has reached the preset value $N_{61}$, then the CPU 58 judges the current value $I_M$ of the square welding current pattern as being sufficiently higher than the expulsion-producing limit current value $I_{S1}$.

If this decision step is carried out for the first time, then the CPU 58 substitutes "1" in the variable n in the equation $I_M \leftarrow I_M - n \times \Delta I_M$, and subtracts a corrective quantity $\Delta I_M$ from the current value $I_M$ according to the equation $I_M \leftarrow I_M - n \times \Delta I_M$, thus determining a new current value $I_M$ in a step S61-5. The welding process carried out with the new current value $I_M$ (see FIG. 26 at (b)).

If the number N of successive welding cycles has not reached the preset value $N_{61}$ in the step S61-4, then the CPU 58 does not correct the current value $I_M$, and welds the workpiece W with the preceding current value $I_M$.

If no expulsions are produced in the step S61-3, then the CPU 58 determines whether the number N of successive welding cycles in which no expulsions are produced has reached a preset value $N_{62}$, or not in a step S61-6. If the number N of successive welding cycles has not reached the preset value $N_{62}$, then the CPU 58 keeps welding the workpiece W with the preceding current value $I_M$ in the step S61-2. If the number N of successive welding cycles has reached the preset value $N_{62}$, then the CPU 58 judges the current value $I_M$ as being substantially the same as the expulsion-producing limit current value $I_{S1}$, (see FIG. 26 at (c)), regards the current value $I_M$ of the square welding current pattern at this time as the expulsion-producing limit current value $I_{S1}$, and stores the current value $I_M$ in a memory (not shown) in a step S61-7.

Then, the CPU 58 generates a square welding current pattern with the current value $I_M$ regarded as the expulsion-producing limit current value $I_{S1}$, and welds the workpiece W at a predetermined number of welding spots with a welding current $I_W$ of the generated square welding current pattern in a step S61-8. Thereafter, the subroutine shown in FIG. 23 comes to an end.

In the step 62, a stepped welding current pattern is generated based on the expulsion-producing limit current value $I_{S1}$ stored in the step S61-7. Since the step S62 is identical to the process that has been described in the third embodiment with reference to FIG. 15, it will not be described in detail below.

In the step S63, a plurality of stepped welding current patterns of types A, B, C shown in FIGS. 27A through 27C are generated from the stepped welding current pattern shown in FIG. 15.

More specifically, the CPU 58 sets the welding current supply period T to 200 milliseconds, for example, and generates three stepped welding current patterns with their respective high currents $I_H$ supplied at different times.

The generated three stepped welding current patterns include a stepped welding current pattern of type A (see FIG. 27A) with the high current $I_H$ supplied at a time $t_{H1}$ that is 53 milliseconds after the welding current has started to be supplied, a stepped welding current pattern of type B (see FIG. 27B) with the high current $I_H$ supplied at a time $t_{H2}$ that is 106 milliseconds after the welding current has started to be supplied, and a stepped welding current pattern of type C (see FIG. 27C) with the high current $I_H$ supplied at a time $t_{H3}$ that is 160 milliseconds after the welding current has started to be supplied.

Inasmuch as three stepped welding current patterns are generated, the times the $t_{H1}$, $t_{H2}$, $t_{H3}$ at which the high current $I_H$ is supplied can be determined as follows:

$t_{H1} = (200-40)/3 = 160/3 \approx 53$ milliseconds;
$t_{H2} = 2t_{H1} \approx 106$ milliseconds; and
$t_{H3} = 3t_{H1} \approx 160$ milliseconds.

Figure 28:
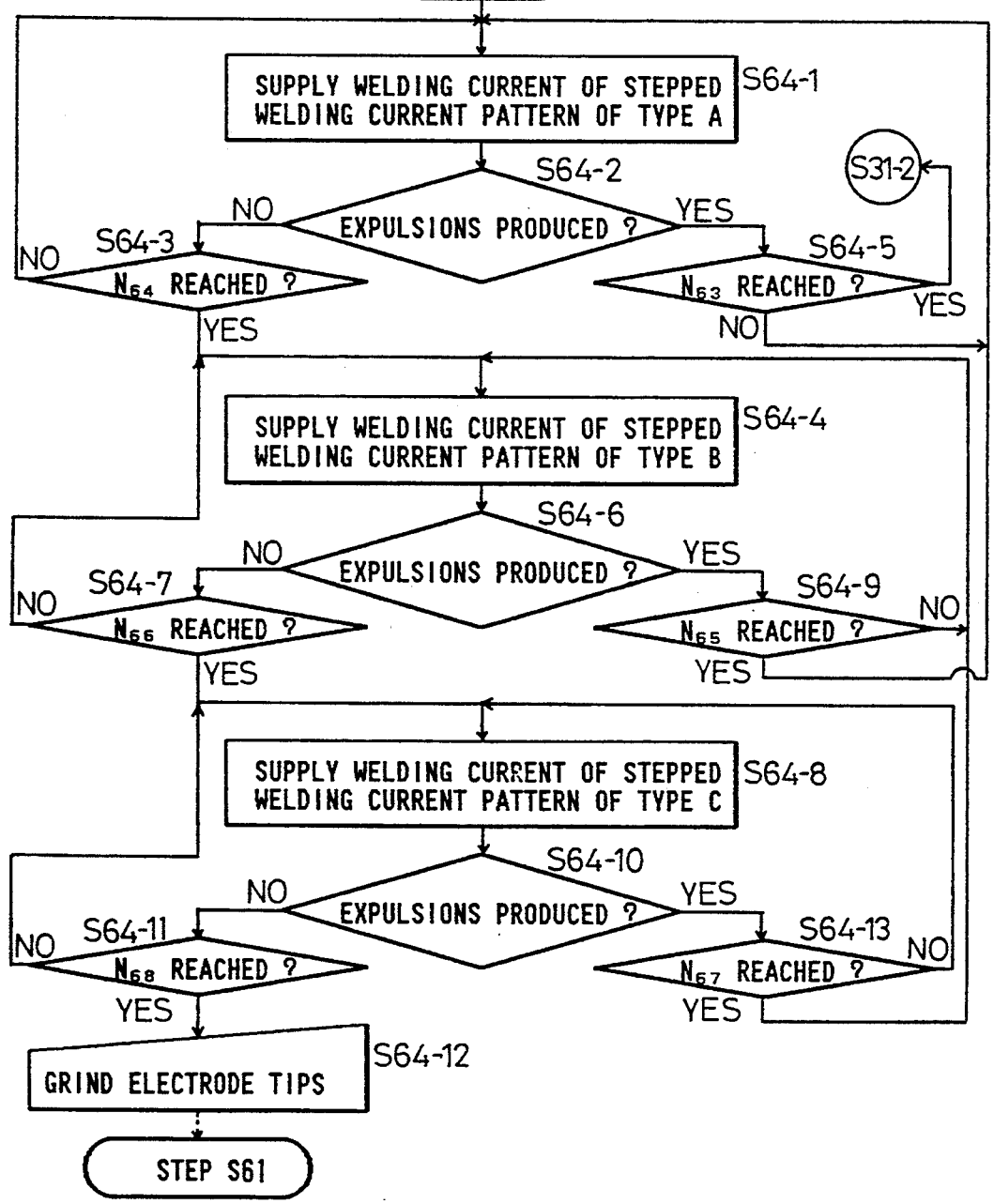
FIG. 28 is a flowchart of a detailed sequence of a step S64 in the main flowchart shown in FIG. 24.

The step 64 of selecting one of the stepped welding current patterns of types A, B, C depending on the manner in which expulsions are produced and welding the workpiece W successively at a predetermined welding points will be described in detail below with reference to FIG. 28.

The operator establishes control conditions for welding the workpiece W with welding currents of stepped welding current patterns. These control conditions include settings $N_{63}$, $N_{65}$, $N_{67}$ for determining the number N of successive welding cycles in which expulsions are produced at the time a plurality of welding points are successively welded, and settings $N_{64}$, $N_{66}$, $N_{68}$ for determining the number of times that expulsions are not produced at the time a plurality of welding points are successively welded. These settings are experimentally obtained.

The CPU 58 selects the stepped welding current pattern of type A for a first welding cycle. The CPU 58 supplies a welding current $I_W$ of the stepped welding current pattern of type A to the workpiece W in a step S64-1, and determines whether expulsions are produced or not in a step S64-2.

If expulsions are not produced, then the CPU 58 determines whether the number N of successive welding cycles in which no expulsions are produced has reached a preset value $N_{64}$ or not in a step S64-3. If the number N of successive welding cycles has reached the preset value $N_{64}$, then the CPU 58 judges the welding current $I_W$ of the stepped welding current pattern of type A as failing to achieve a sufficient welding strength, and supplies a welding current $I_W$ of the stepped welding current pattern of type B to the workpiece in a step S64-4.

If expulsions are produced in the step S64-2, then the CPU 58 determines whether the number N of successive welding cycles in which expulsions are produced has reached a preset value $N_{63}$, or not in a step S64-5. If the number N of successive welding cycles has reached the preset value $N_{63}$, then the CPU 58 judges the high current $I_H$ as being too high, and executes the step S31-2 and following steps to determine an expulsion-producing limit current value $I_{S1}$ in a square welding current pattern.

If the number N of successive welding cycles has not reached the preset value $N_{63}$ in the step S64-5, or if the number N of successive welding cycles has not reached the preset value $N_{64}$ in the step S64-3, then the CPU 58 judges expulsions as being occasionally produced, i.e., judges the workpiece W as being welded with the stepped welding current $I_W$ which can achieve a sufficient welding strength, and continuously welds the workpiece W with the welding current $I_W$ of the stepped welding current pattern of type A in the step S64-1.

The CPU 58 determines whether expulsions are produced or not with the welding current $I_W$ of the stepped welding current pattern of type B in a step S64-6. If no expulsions are produced, then the CPU 58 determines whether the number N of successive welding cycles in which no expulsions are produced has reached a preset value $N_{66}$ or not in a step S64-7. If the number N of successive welding cycles has reached the preset value $N_{66}$, then the CPU 58 judges the welding current $I_W$ of the stepped welding current pattern of type B as failing to achieve a sufficient welding strength, and welds the workpiece W with a welding current IW of the stepped welding current pattern of type C in a step S64-8.

If expulsions are produced in the step S64-6, then the CPU 58 determines whether the number N of successive welding cycles in which expulsions are produced has reached a preset value $N_{65}$ or not in a step S64-9. If the number N of successive welding cycles has reached the preset value $N_{65}$, then the CPU 58 welds the workpiece W with the welding current $I_W$ of the stepped welding current pattern of type A in the step S64-1.

If the number N of successive welding cycles has not reached the preset value $N_{65}$ in the step S64-9, or if the number N of successive welding cycles has not reached the preset value $N_{66}$ in the step S64-7, then the CPU 58 judges expulsions as being occasionally produced, i.e., judges the workpiece W as being welded with the stepped welding current $I_W$ which can achieve a sufficient welding strength, and continuously welds the workpiece W with the welding current $I_W$ of the stepped welding current pattern of type B in the step S64-4.

Thereafter, the CPU 58 determines whether expulsions are produced or not with the welding current $I_W$ of the stepped welding current pattern of type C in a step S64-10. If no expulsions are produced, then the CPU 58 determines whether the number N of successive welding cycles in which no expulsions are produced has reached a preset value $N_{68}$ or not in a step S64-11. If the number N of successive welding cycles has reached the preset value $N_{68}$, then the CPU 58 judges the welding current $I_W$ of the stepped welding current pattern of type C as failing to achieve a sufficient welding strength because the welding current is reduced by a decrease in the contact resistance due to wear of the electrode tips 42, 43, which causes an increase in a contact area and displays a prompt to grind or dress the electrode tips 42, 43 on the CRT 38. After the electrode tips 42, 43 have been ground in a step S64-12, the CPU 58 executes the step S61 again.

If expulsions are produced in the step S64-10, then the CPU 58 determines whether the number N of successive welding cycles in which expulsions are produced has reached a preset value $N_{67}$ or not in a step S64-13. If the number N of successive welding cycles has reached the preset value $N_{67}$, then the CPU 58 welds the workpiece W with the welding current of the stepped welding current pattern of type B in the step S64-4.

If the number N of successive welding cycles has not reached the preset value $N_{67}$ in the step S64-13, or if the number N of successive welding cycles has not reached the preset value $N_{68}$ in the step S64-11, then the CPU 58 judges expulsions as being occasionally produced, i.e., judges the workpiece W as being welded with the stepped welding current $I_W$ which can achieve a sufficient welding strength, and continuously welds the workpiece W with the welding current $I_W$ of the stepped welding current pattern of type C in the step S64-8.

In the step S64, as described above, when the workpiece W is to be welded successively at a plurality of welding points, any one of the stepped welding current patterns of types A, B, C is selected dependent on the manner in which expulsions are produced, and the workpiece W is welded with a welding current of the selected stepped welding current pattern.

When the workpiece W is welded with a supplied welding current $I_W$ of a stepped welding current pattern composed of the high and low currents $I_H$, $I_L$, the time at which the high current $I_H$ is generated may be varied within the welding current supply period T even if the average current $I_A$ and the high current supply period $t_1$ remain the same. It has been experimentally confirmed that this control mode is effective to prevent expulsions from being produced and good nuggets can be formed.

It has also been experimentally confirmed that during an initial period of time of a process of successively welding a plurality of welding points, the high current $I_H$ may be supplied initially in the welding current supply period T, and the time at which the high current $I_H$ is generated may be shifted toward the end of the welding current supply period T as the number N of successive welding cycles or spots increases for accomplishing a stable and sufficient welding strength (see FIGS. 29A through 29C, 4 through 6).

Based on the results of the above experiments, the stepped welding current patterns of types A, B, C with their high currents $I_{H1}$ generated at different times are generated in the step S63, and the workpiece W starts being welded with the welding current $I_W$ of the stepped welding current pattern of type A and the welding current $I_W$ of the stepped welding current pattern of type B or C is selected based on whether expulsions are produced or not, and supplied to weld the workpiece W in the step S64. In the step S64, therefore, the workpiece W is welded with a welding current $I_W$ having a stepped welding current pattern with its high current $I_{H1}$ supplied at an optimum time.

In the sixth embodiment, as described above, three stepped welding current patterns of types A, B, C are generated. However, an increased number of stepped welding current patterns may be generated., or a detailed lookup table of data relative to the manner in which expulsions are produced and the times $t_{H1}$, $t_{H2}$, $t_{H3}$ at which the high current $I_{H1}$ is generated may be stored in the welding controller 30 to more accurately control the times at which the high current $I_{H1}$.

In the sixth embodiment, the workpiece is welded with the optimum welding current $I_W$ with the current value $I_M$ of the square welding current pattern being used as the expulsion-producing limit current value $I_{S1}$, and is continuously welded with the welding current $I_W$ of the stepped welding current pattern of type A in which the high current $I_H$ is supplied at the time $I_{H1}$ that is 53 milliseconds after the welding current has started to be supplied, among the stepped welding current patterns that are generated based on the expulsion-producing limit current value $I_{S1}$.

Depending on the manner in which expulsions are produced when the welding current $I_W$ of the stepped welding current pattern of type A is supplied to weld the workpiece W, one of the stepped welding current patterns of types B, C is selected, and the workpiece W is welded with the welding current $I_W$ of the selected stepped welding current pattern. Thus, the number of welding points that can successively be welded can be increased, expulsions are prevented from being produced, and a high welding strength can stably be achieved.

In the sixth embodiment, expulsions are detected based on the secondary current $I_2$. However, expulsions may be detected based on the primary current $I_1$, the voltage between the electrode tips 42, 43, the displacement of the electrode tips 42, 43, the acceleration of displacement of the electrode tips 42, 43, acoustic emission, or the like.

Although certain preferred embodiments of the present invention has been shown and described in detail, it should be understood that various changes and modifications may be made therein without departing from the scope of the appended claims.

What is claimed is:

1. A method of controlling a welding current for welding a workpiece successively at a plurality of welding points with a direct-current resistance welding machine, comprising the steps of:

welding the workpiece with a stepped welding current having at least a first current value and a second current value greater than said first current value;

applying both said first and second current values to each of the welding points in a predetermined welding current waveform, wherein said second current value is initiated at a predetermined start time in said welding current waveform;

if expulsions are produced on the workpiece while it is welded, shifting said predetermined start time when said second current value is applied with respect to each of the welding points, so that said start time occurs earlier in said welding current waveform; and if no expulsions are produced on the workpiece while it is welded, shifting said predetermined start time when said second current value is applied with respect to each of said welding points, so that said start time occurs later in said welding current waveform.

2. A method of controlling a welding current for welding a workpiece successively at a plurality of welding points with a direct-current resistance welding machine, comprising the steps of:

welding the workpiece with a stepped welding current having at least a first current value and a second current value greater than said first current value;

applying both said first and second current values to each of said welding points in a predetermined welding current waveform, wherein said second current value is initiated at a predetermined start time in said welding current waveform; and successively shifting said predetermined start time when said second current value is applied, with respect to each of said welding points, after a predetermined number of welding points have been welded.

3. A method of controlling a welding current for welding a workpiece successively at a plurality of welding points with a direct-current resistance welding machine, comprising the steps of:

welding the workpiece at each of the welding points with a constant current for a welding current supply period;

varying said constant current depending on whether expulsions are produced on the workpiece while it is welded, to determine an expulsion-producing limit current value as a maximum current beyond which expulsions will be produced;

welding the workpiece with a first stepped welding current having a first current value that is smaller than said expulsion-producing limit current value by a predetermined value and a second current value that is greater than said expulsion-producing limit current value by a predetermined value, and an average current value higher than said expulsion-producing limit current value; and welding the workpiece with a second stepped welding current in which said second current value has been varied based on whether or not expulsions are produced on the workpiece while it is welded with said first stepped welding current.

4. A method of controlling a welding current for welding a workpiece successively at a plurality of welding points with a direct-current resistance welding machine, comprising the steps of:

welding the workpiece at each of the welding points with a constant current for a welding current supply period;

varying said constant current depending on whether expulsions are produced on the workpiece while it is welded, to determine an expulsion-producing limit current value as a maximum current beyond which expulsions will be produced;

welding the workpiece with a first stepped welding current having a first current value that is smaller than said expulsion-producing limit current value by a predetermined value and a second current value that is greater than said expulsion-producing limit current value, and an average current value higher than said expulsion-producing limit current value;

welding the workpiece with a second stepped welding current in which said second current value has been varied based on whether or not expulsions are produced on the workpiece while it is welded with said first stepped welding current; and welding the workpiece with another stepped welding current in which the time when said second current value is attained has been shifted within the period in which said second stepped welding current is supplied based on whether or not expulsions are produced on the workpiece while it is welded with said second stepped welding current.

5. The method according to claim 3 or 4, further comprising the steps of:

increasing said constant current if expulsions are not produced successively a first number of times while the workpiece is being welded with said constant current; and reducing said constant current if expulsions are produced successively a second number of times while the workpiece is being welded with said constant current.

6. The method according to claim 3 or 4, further comprising the steps of:

increasing said second current value if expulsions are not produced successively a third number of times while the workpiece is being welded with said second stepped welding current; and reducing said second current value if expulsions are produced successively a fourth number of times while the workpiece is being welded with said second stepped welding current.

7. The method according to claim 4, further comprising the steps of:

delaying the time when said second current value is attained within the welding current supply period if expulsions are not produced successively a fifth number of times while the workpiece is being welded with said second stepped welding current; and advancing the time when said second current value is attained within the welding current supply period if expulsions are produced successively a sixth number of times while the workpiece is being welded with said second stepped welding current.

8. A method of controlling a welding current for welding a workpiece successively at a plurality of welding points with a direct-current resistance welding machine, comprising the steps of:

welding the workpiece at each of the welding points with a constant current for a welding current supply period;

varying said constant current depending on whether expulsions are produced on the workpiece while it is welded, to determine an expulsion-producing limit current value as a maximum current beyond which expulsions will be produced;

welding the workpiece with a first stepped welding current having a first current value that is smaller than said expulsion-producing limit current value by a predetermined value and a second current value that is greater than said expulsion-producing limit current value, and an average current value higher than said expulsion-producing limit current value;

delaying the time when said second current value is attained by a predetermined time from the start time of supplying said first stepped welding current at each of the welding points, to produce a second stepped welding current; and welding the workpiece with said second stepped welding current in which the time when said second current value is attained has been shifted within the period in which said second stepped welding current is supplied based on whether or not expulsions are produced on the workpiece while it is welded with said second stepped welding current.

9. The method according to claim 8, further comprising the steps of:

increasing said constant current if expulsions are not produced successively a first number of times while the workpiece is being welded with said constant current; and reducing said constant current if expulsions are produced successively a second number of times while the workpiece is being welded with said constant current.

10. The method according to claim 8, further comprising the steps of:

increasing said second current value if expulsions are not produced successively a third number of times while the workpiece is being welded with said second stepped welding current; and reducing said second current value if expulsions are produced successively a fourth number of times while the workpiece is being welded with said second stepped welding current.

11. A method according to claim 8, further comprising steps of:

delaying the time when said second current value is attained within the welding current supply period if expulsions are not produced successively a fifth number of times while the workpiece is being welded with said stepped welding current; and advancing the time when said second current value is attained within the welding current supply period if expulsions are produced successively a sixth number of times while the workpiece is being welded with said stepped welding current.

12. A method of controlling a welding current for welding a workpiece successively at a plurality of welding points with a direct-current resistance welding machine, comprising the steps of:

welding the workpiece at each of the welding points with a constant current for a welding current supply period;

varying said constant current depending on whether expulsions are produced on the workpiece while it is welded, to determine an expulsion-producing limit current value as a maximum current beyond which expulsions will be produced;

welding the workpiece at each of the welding points successively for a given number of welding points with a welding current having said expulsion-producing limit current value;

after the workpiece has been welded at the given number of welding points, welding the workpiece with a stepped welding current having a first current value that is smaller than said expulsion-producing limit current value by a predetermined value and a second current value that is greater than said expulsion-producing limit current value, and an average current value higher than said expulsion-producing limit current value;

delaying the time when said second current value is attained within the welding current supply period if expulsions are not produced successively a first number of times while the workpiece is being welded with said stepped welding current; and advancing the time when said second current value is attained within the welding current supply period if expulsions are produced successively a second number of times while the workpiece is being welded with said stepped welding current.

* * * * *